(12) United States Patent
Durieux et al.

(10) Patent No.: US 12,129,949 B2
(45) Date of Patent: Oct. 29, 2024

(54) COUPLING ELEMENT FOR A FLUIDIC CONNECTION TO A TERMINAL

(71) Applicant: STAUBLI FAVERGES, Faverges-Seythenex (FR)

(72) Inventors: Christophe Durieux, Gilly sur Isere (FR); Serafim Marques Barroca, Albertville (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 18/222,414

(22) Filed: Jul. 14, 2023

(65) Prior Publication Data
US 2024/0019065 A1 Jan. 18, 2024

(30) Foreign Application Priority Data
Jul. 15, 2022 (FR) .................................... 2207281

(51) Int. Cl.
| | |
|---|---|
| *F16L 37/092* | (2006.01) |
| *F16L 37/12* | (2006.01) |
| *F16L 37/38* | (2006.01) |
| *F16L 37/40* | (2006.01) |

(52) U.S. Cl.
CPC ....... *F16L 37/0927* (2019.08); *F16L 37/1215* (2013.01); *F16L 37/38* (2013.01); *F16L 37/40* (2013.01)

(58) Field of Classification Search
CPC . F16L 37/42; F16L 37/40; F16L 37/38; F16L 37/0927; F16L 37/1215
See application file for complete search history.

(56) References Cited

U.S. PATENT DOCUMENTS

| | | | | |
|---|---|---|---|---|
| 3,387,865 | A | * | 6/1968 | Ross ..................... E21B 17/046 279/2.03 |
| 3,757,836 | A | * | 9/1973 | Masuda .................... F17C 5/00 141/351 |
| 6,073,971 | A | * | 6/2000 | Weh ..................... F16L 37/1215 285/35 |

(Continued)

FOREIGN PATENT DOCUMENTS

| | | | |
|---|---|---|---|
| EP | 0983461 B1 | 5/2003 | |
| EP | 2039974 A2 | * 3/2009 | .......... F16L 37/0925 |

(Continued)

OTHER PUBLICATIONS

FR App No. 2207281; Search Report mailed Feb. 7, 2023.

*Primary Examiner* — David Colon-Morales
(74) *Attorney, Agent, or Firm* — MARSHALL, GERSTEIN & BORUN LLP

(57) ABSTRACT

A coupling element for a terminal with cylindrical shell includes a coupling body; a valve; a barrel body movable in translation; clamping tabs, moved by cooperation with a tapered portion of the coupling body, between initial and clamping radial positions; means of transmission. The barrel body or the clamping tabs being apt to drive the valve via the means of transmission, from a forward position of closing of the body to a rear open position, when the clamping tabs move from the initial radial position to the radial clamping position; and a port in the coupling body letting through the means of transmission when the valve is in the rear position.

16 Claims, 15 Drawing Sheets

(56) References Cited

U.S. PATENT DOCUMENTS

| | | | | |
|---|---|---|---|---|
| 6,375,152 | B1 * | 4/2002 | Weh | F16L 37/1215 251/149.6 |
| 7,293,758 | B2 * | 11/2007 | Hsueh-Feng | F16L 37/0925 251/149.6 |
| 7,455,280 | B2 * | 11/2008 | Parrish | F16L 37/0925 251/149.6 |
| 7,568,737 | B2 * | 8/2009 | Wells | F16L 37/1215 285/391 |
| 8,007,009 | B2 * | 8/2011 | Vogel | F16L 37/1215 285/35 |
| 8,297,658 | B2 * | 10/2012 | Le Quere | F16L 37/1215 285/308 |
| 9,115,838 | B2 * | 8/2015 | Konishi | F16L 21/08 |
| 10,400,913 | B2 * | 9/2019 | Konishi | F16K 31/602 |
| 10,718,455 | B2 * | 7/2020 | Danielson | F16L 37/1215 |
| 11,815,213 | B2 * | 11/2023 | Durieux | F16L 37/1215 |
| 2005/0127114 | A1 | 6/2005 | Parrish | |
| 2007/0210273 | A1 | 9/2007 | Hsueh-Feng | |

FOREIGN PATENT DOCUMENTS

| | | |
|---|---|---|
| EP | 2039974 A3 | 10/2009 |
| FR | 3119657 A1 | 8/2022 |

* cited by examiner

COUPLING ELEMENT FOR A FLUIDIC CONNECTION TO A TERMINAL

FIELD OF THE DISCLOSURE

The present invention relates to a coupling element for a fluidic coupling to a terminal having an interface with cylindrical shell.

BACKGROUND

The French patent application FR2101122, not published at the relevant date, describes a coupling element with tabs, received in respective openings of a barrel, and sliding along a body with a tapered portion. The axial position of the tabs along the tapered portion determines the radial position of the tabs. The tabs are used for rigidly attaching a terminal having a cylindrical interface. Such construction means that the coupling element is able to couple with terminals of different dimensions, since the tabs adapt to the size of the terminal received by being positioned axially along the tapered portion during the coupling. Another particularity of the construction is that the tabs, when same are in a radial clamping position for holding a coupled terminal, are in an axial position which is intermediate between the axial position of the tabs when the coupling element is uncoupled, and the axial position of the tabs used for removing the terminal which was coupled. Indeed, the geometry of the terminal determines the axial and radial position of the tabs, hence also the position of the terminal within the coupling element when same is coupled thereto. One example provides that the tapered portion and the tabs are turned radially outwards, so as to hold an inner cylindrical interface terminal in the coupled configuration. In such example, the coupling element remains open, i.e. the inner conduit thereof is open, when same is not coupled with a terminal, which is not suitable for certain applications requiring the coupling element to close, i.e. the inner conduit thereof to be closed, once uncoupled. Another example provides that the tapered portion and the tabs are turned radially inwards, so as to hold an outer cylindrical interface terminal in the coupled configuration. For said other example, the coupling element comprises a ring which has the role of a valve, for automatically closing the coupling element when same is uncoupled. During the coupling to the terminal, provision is made for a support ring, driven rearwards by the terminal, to drive the valve rearwards, so as to open the coupling element. Due to such construction, the drive of the valve-ring by the support ring depends on the depth of insertion of the interface onto the tabs and on the diameter of the external interface. The above generally leads to providing for the coupling element to be very bulky, in particular along the longitudinal direction, so that the valve ring is both open in the coupled configuration and closed in the uncoupled configuration, regardless of the geometry of the insertion of interface onto the tabs for a terminal which can be held coupled by means of the tabs.

U.S. Pat. No. 6,375,152B1 describes a quick-connect coupling element apt to be coupled with a connector by the inside of said connector. The coupling element comprises a tubular body, retaining teeth hooked to an outlet end of the tubular body, a sliding sleeve for actuating the teeth, received within the body, a valve for closing the tubular body, and a sealing piston mounted on the valve via a ball joint. The coupling element further comprises a spring for returning the valve forwards to a closed position against the sleeve, a spring for returning the sliding sleeve forwards to a position where the sleeve holds the teeth in the locking position of the connector, and an annular spring returning the teeth radially inwards, in the unlocking position of the connector, when the sliding sleeve does not resist thereto. In the coupled configuration, an inner front wall of the connector abuts in a leak-tight way against the sealing piston, by means of which the connector holds the valve in the open position, rearwards with respect to the sliding sleeve. In the coupled configuration, the teeth retain the connector from the inside, being held in position by the sliding sleeve, which is in an advanced position, radially inside the teeth. To uncouple, the sliding sleeve is moved to the withdrawal position against the action of the spring, which allows the teeth to be brought radially inwards under the action of the annular spring, the teeth then releasing the connector. The sleeve being pulled rearwards, the sleeve abuts against the valve, which closes the coupling element. The uncoupled connector no longer holds the valve rearwards. Thereby, when the sliding sleeve is released and the connector has been uncoupled, the valve and the sliding sleeve are brought forwards under the action of the springs, while keeping the coupling element closed.

According to such construction, the position of the valve, defining whether or not the coupling element is open, depends entirely on the geometry of the connector which is coupled thereto, since the valve is opened by pressing the connector onto the valve via the sealing piston. Moreover, if the geometry of the connector were inaccurate, or if the connector is worn, it is not guaranteed that the opening of the valve is optimal. Finally, the construction requires the terminal to have an inner front wall for actuating the valve, which provides only a very small flow cross-section for the fluid and/or a large radial bulk for the coupling element.

SUMMARY

One aim of the invention is in particular to remedy the aforementioned drawbacks. The invention is aimed at providing a novel coupling element which, while being suitable for a fluidic coupling with a terminal having an interface with a cylindrical shell with dimensions which can vary, opens automatically and closes automatically when uncoupled from the terminal and has a reduced bulk and/or an increased cross-section for the fluid flow.

The invention relates to a coupling element for a fluidic coupling to a terminal, the terminal having an interface with cylindrical shell, the coupling element comprising:
- a coupling body, delimiting an inner conduit for a fluid flow, the inner conduit extending along a longitudinal axis,
- a valve, movable in longitudinal translation with respect to the coupling body inside the inner conduit, the valve being elastically returned along a forward direction to a forward position, where the valve closes the inner conduit, in an uncoupled configuration of the coupling element, and
- clamping tabs.

According to the invention, the coupling element comprises:
- a barrel body, arranged around a first radial surface of the coupling body, the first radial surface being radially oriented along the direction opposite to the longitudinal axis, the barrel body being movable in translation with respect to the coupling body, each clamping tab being received in a respective opening belonging to the barrel body, each clamping tab being moved in translation radially with respect to the barrel body, within the respective opening thereof and with respect to the coupling body, by mechanical cooperation of the clamping tab with a tapered portion of the coupling body, centered on the longitudinal axis and oriented along a rearward direction, said radial translational movement taking place from an initial radial position of the clamping tab, in the uncoupled configuration of the coupling element, to a radial clamping position of the clamping tab offset along the longitudinal axis along the rearward direction with respect the initial radial position, each clamping tab comprising a cooperating surface formed radially opposite the tapered portion and configured for mechanically cooperating with the interface of the terminal and thereby preventing a withdrawal of the terminal from the coupling body when the clamping tab is in the radial clamping position, a first elastic return member, returning the barrel body along the forward direction, the barrel body abutting along the forward direction against the clamping tabs when the clamping tabs are in the radial clamping position, means of transmission, interposed between the valve and a drive element, among the barrel body and at least one of the clamping tabs, the drive element being apt to drive the valve via the means of transmission, from the forward position to a rear position, where the valve opens the inner conduit, when the clamping tabs move from the initial radial position to the radial clamping position, and at least one port, provided through the coupling body, coupling the inner conduit to a volume surrounding the first radial surface of the coupling body, the means of transmission extending through the port or ports when the valve is in the rear position.

An idea underlying the invention is to provide that the valve is actuated by the drive element, namely the barrel body or at least one of the clamping tabs, via the means of transmission, rather than directly by a support ring or by an inner front wall of the terminal as such, as was provided for in the prior art. In comparison with the prior art, it is thus not provided for that the coupling element and the terminal must have surfaces which abut axially against the coupling, specifically for actuating the valve. The absence of such surfaces can be used for reducing the bulk, in particular radially, of both the coupling element and the terminals compatible with the coupling element. In other words, at equal radial bulk, it is advantageously possible to obtain a larger flow cross-section for the fluid or to provide for other functions within the coupling.

By means of the invention, since, during the use of the coupling element, the axial position of the barrel body and the tabs with respect to the coupling body in the clamping position depends solely on the diameter of the interface, the position of the valve in the coupled configuration depends only on the diameter of the interface and the depth of insertion of the interface onto the tabs does not count in the axial position of the valve in the coupled configuration, which limits the overtravel of the valve inside the body during coupling. Such advantages are not obtained in the prior art, in particular when the prior art provides for that the opening of the valve is controlled by the displacement of a support ring, the axial position of which with respect to the coupling body, depends both on the diameter of the interface and on the depth of insertion of the interface onto the tabs.

Preferably, the means of transmission are apt to cross longitudinally through the port or ports, from the volume surrounding the first radial surface of the coupling body into the inner conduit.

Preferably, along the longitudinal axis, the or each port has a length which is strictly less than a maximum travel traveled by the valve, when the barrel body is moved longitudinally from the position thereof in the uncoupled configuration of the coupling element to a rear abutment position against the coupling body.

Preferably, the means of transmission are formed by one among the valve or the drive element and form a first surface apt to abut along the longitudinal axis onto a second surface belonging to the other among the drive element or the valve.

Preferably, the means of transmission comprise at least one longitudinal lug and the port is delimited by opposite guide surfaces of the coupling body, along a direction circumferential to the longitudinal axis, the longitudinal lug being apt to come into contact with each of the guide surfaces.

Preferably, the or each longitudinal lug is formed by the valve; the first surface is formed at a front end of the valve; and the second surface is formed at a rear end of the barrel body.

Preferably, the means of transmission are formed by a transmission ring, distinct from the barrel body, the clamping tabs and the valve, the transmission ring having a front surface apt to come into contact with a rear surface of the barrel body or of the clamping tabs and having a rear surface apt to come into contact a front surface of the valve.

Preferably, when the coupling element is in the uncoupled configuration, the means of transmission are longitudinally disengaged from the drive element and/or from the valve.

Preferably, in any configuration of the coupling element: the means of transmission are rigidly attached to the drive element and to the valve, parallel to the longitudinal axis; and in addition to the return of the barrel body along the forward direction, the first elastic return member returns the valve to the forward position.

Preferably, the coupling element is configured so that the fluidic coupling takes place with the terminal having an interface with inner cylindrical shell and the tapered portion is formed by the first radial surface of the coupling body.

Preferably, the coupling element comprises: a support ring which, when the coupling element is in the uncoupled configuration, is mounted around the barrel body and the clamping tabs, and a second elastic return member pushing the support ring back in the forward direction. Preferably, the volume surrounding the first radial surface of the coupling body is radially delimited on the outside by the support ring and fluidically communicates with the inner conduit through the port or the ports; and a front end of the support ring has a front seal for leak-tight contact with the terminal, whereas the support ring is radially sealed with the coupling body at the rear of the volume radially delimited by the support ring and the first radial surface of the coupling body.

Preferably, each clamping tab has a front face which delimits the cooperation surface in the forward direction. Preferably, in the uncoupled configuration, the clamping tabs are in radial abutment against an abutment surface of the barrel body; and a part of the front face of each clamping tab emerges from a surface of the barrel body opposite the abutment surface and arranged at the front of the clamping tabs, each front face axially facing a mouth of the coupling element.

Preferably, the first elastic return member is arranged radially on the outside with respect to the means of transmission.

Preferably, the valve comprises:
- a solid central portion delimiting, along with the coupling body, a passage for the fluid in the inner conduit, the passage being reduced when the valve is in the forward position, with respect to the rear position, the valve in the forward position preferably abutting against the coupling body via a seal for closing the inner conduit in a leak-tight way;
- a rear skirt; and
- a front skirt, the rear skirt and the front skirt being arranged on both sides of the solid central portion along the longitudinal axis and mechanically cooperating with reduced radial play with a second inner radial surface of the coupling body, for a radial guiding of the movement of the valve between the forward position and the rear position, the second inner radial surface delimiting the inner conduit.

Preferably, each opening of the barrel body receiving one of the clamping tabs is delimited longitudinally by two opposite parallel axial walls and circumferentially by two opposite parallel orthoradial walls, the axial and orthoradial walls being apt to come into contact with the clamping tab, so as to guide the radial displacement of the clamping tab with respect to the barrel body.

BRIEF DESCRIPTION OF THE DRAWINGS

The invention will be better understood and other advantages thereof will appear more clearly in the light of the following description, presenting examples according to the principle of the invention, with reference to the enclosed drawings.

FIGS. 1 to 7 show a coupling element 1 according to an embodiment. The coupling element 1 is able to carry a fluid F, the path of which is symbolized by arrows in FIG. 7. The coupling element 1 comprises a coupling body 10, a valve 30, clamping tabs 50, a barrel body 60 and a support ring 70. For the present embodiment, the valve 30 and the barrel body 60 are distinct.

DETAILED DESCRIPTION

Figure 1:
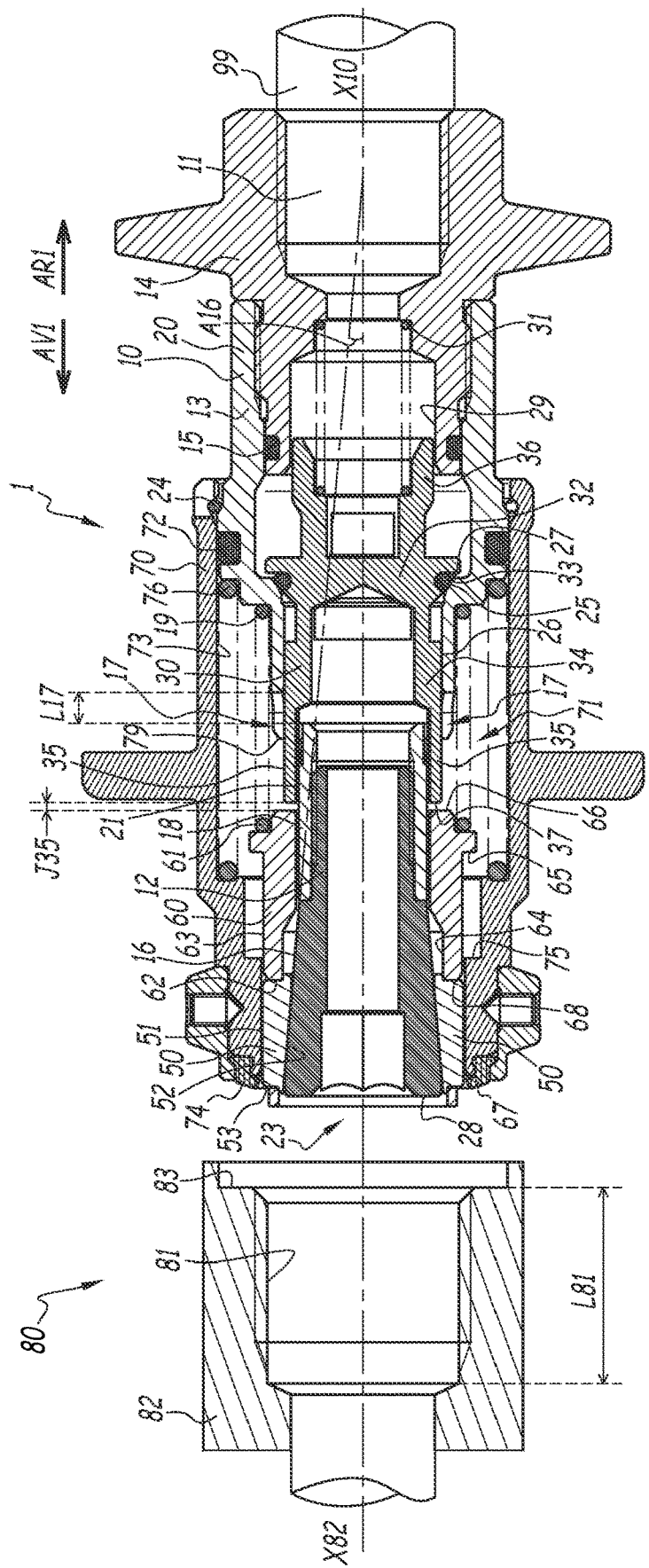
FIG. 1 is a longitudinal section of a coupling element according to a first embodiment of the invention, shown in an uncoupled configuration, where the coupling element is uncoupled from a terminal.
Figure 2:
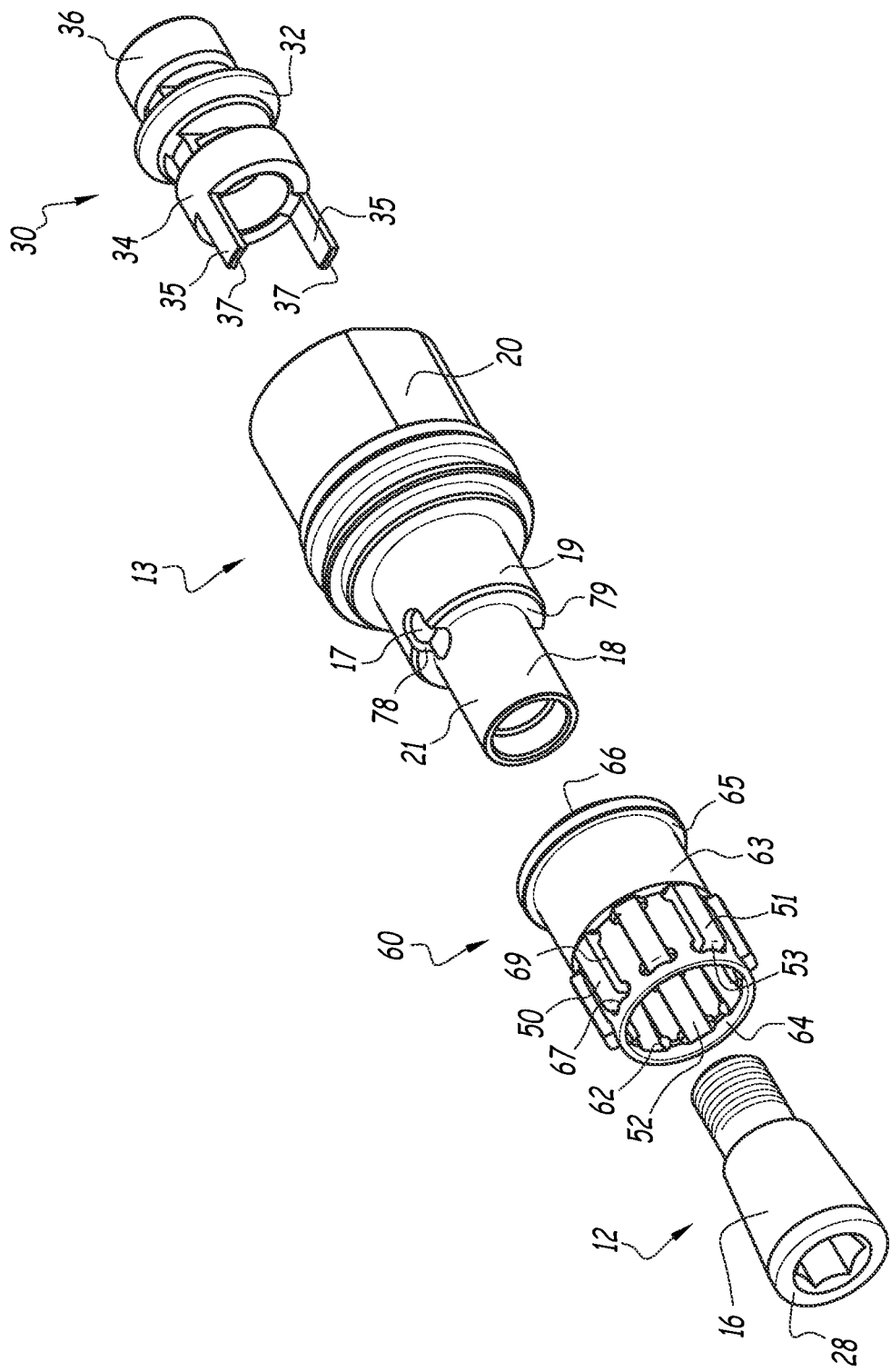
FIG. 2 is an exploded perspective view of the coupling element shown FIG. 1.
Figure 5:
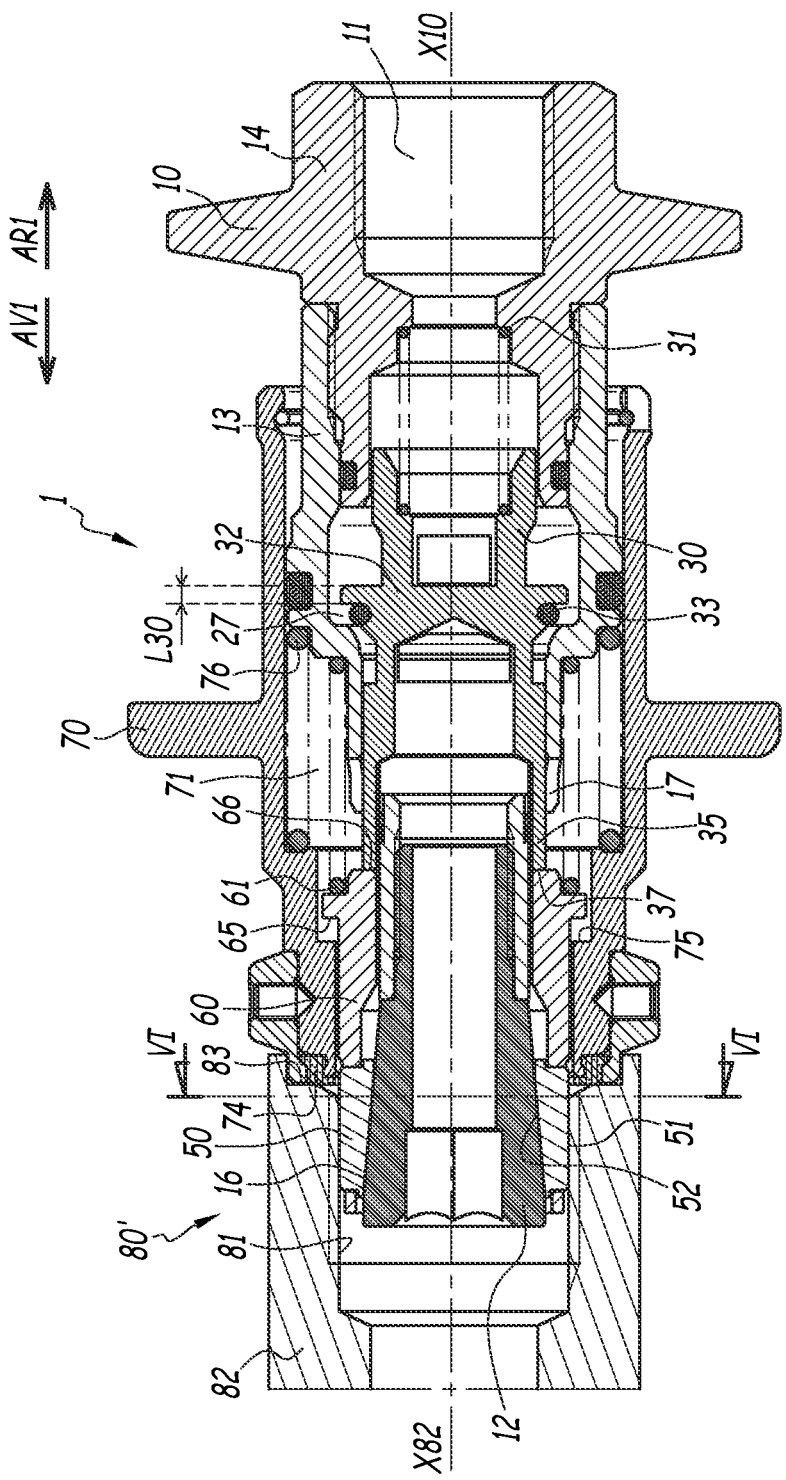
FIG. 5 is a section similar to the section shown in FIGS. 1 and 3, wherein the coupling element is shown in a coupled configuration, where the coupling element is coupled with another terminal.
Figure 7:
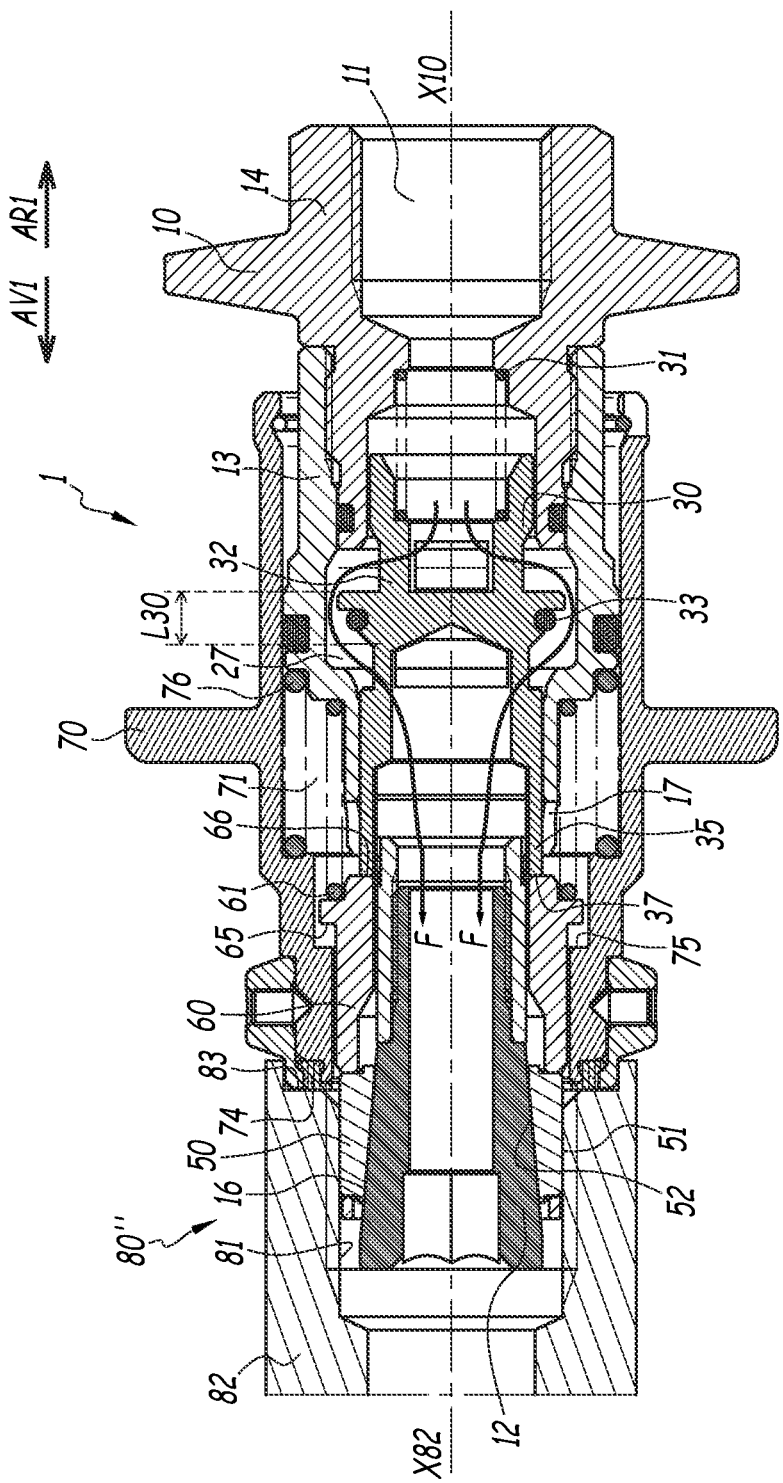
FIG. 7 is a view similar to the view shown in FIG. 5 for yet another terminal.

The coupling element 1 is designed to be coupled in a removable way to a terminal, such as terminals 80, 80' and 80" shown in FIGS. 1, 5 and 7, respectively, in order to couple a fluid duct 99 to the coupled terminal.

A fitting axis, or longitudinal axis X10, is defined and is fixed with respect to the coupling body 10. Hereinafter, expressions such as "axial", "longitudinal" and "radial", "circumferential" are defined with respect to the axis X10, unless otherwise stated. A forward direction AV1, parallel to the axis X10, is defined and is directed from the coupling element 1 towards the terminal to be coupled. A rearward direction AR1 is defined, in the opposite direction. The expression "forward", when it concerns the coupling element 1, is directed along the direction AV1. The expression "rear", when it concerns the coupling element 1, is directed along the direction AR1.

A radial direction is defined as being an orthogonal and secant direction, i.e. perpendicular, to a longitudinal axis, herein the longitudinal axis X10. A radial face is a face which extends about the longitudinal axis. For a given element, the term "inner" means "oriented towards the longitudinal axis, along the radial direction of said element", whereas the term "outer" means "oriented along the direction opposite to the longitudinal axis, along the radial direction of said element".

A direction circumferential to a longitudinal axis is defined as a direction circular about the longitudinal axis and centered on the longitudinal axis. In other words, when an element is rotating about a longitudinal axis, a moving point of said element moves along a circumferential direction. There are thus two circumferential directions with respect to a longitudinal axis, corresponding to the two directions of rotation about the longitudinal axis.

The coupling body 10 is connected to the fluid duct 99. The body 10 delimits an inner conduit 11 for the fluid, which extends coaxially with the axis X10. More generally, the body 10 is centered on the axis X10 and extends along the axis X10. The body 10 has e.g. a shape of revolution about the axis X10.

The terminals 80, 80' and 80" are identical, except for the interface diameter thereof mentioned hereinafter and, if appropriate, for the interface length thereof. Henceforth, any feature indicated for one of terminals 80, 80' and 80" applies to the others, unless otherwise stated. The terminal 80 comprises a terminal body 82, which is tubular, for conducting the flow of fluid F. A central axis X82 is defined, with which the body 82 is coaxial and which is fixed with respect to the body 82. The body 82 forms an interface 81. In the present example, the interface 81 is inner, being formed on the inside of the body 82. The interface 81 has a cylindrical shell centered on the axis X82. The interface 81 comes out onto a front face 83 of the terminal 80. When the terminal 80 and the coupling element 1 are coupled, the interface 81 is advantageously coaxial with the axis X10.

Expressions such as "axial", "longitudinal" and "radial" can also be defined with respect to the axis X82 axis when same relate to the terminal 80, unless otherwise stated. The expression "forward", when same concerns the terminal 80, is directed along the opposite direction to direction AV1. The expression "rear", when same concerns the terminal 80, is along the same direction as the direction AV1 of the element 1.

The interface 81 extends over an interface length L81, measured longitudinally. From one terminal 80, 80', 80" to the other, the diameter of the interface 81, called "interface diameter", differs. The interface diameter of the terminal 80' shown in FIG. 5 has a minimum value. The interface diameter of the terminal 80" shown in FIG. 7 has a maximum value. The interface diameter of the terminal 80 shown in FIGS. 1 and 3 has an intermediate value between the minimum and maximum values. Despite such different diameter, the terminals 80, 80' and 80" can all be coupled to the coupling element 1. The interface diameter of the terminal 80" is the maximum acceptable for the coupling element 1 in the present example. The interface diameter of the terminal 80' is the minimum acceptable for the coupling element 1 in the present example. Hereinafter, any terminal, whatever the interface diameter thereof, is identified by the reference 80, unless specifically mentioned.

Along the axis X10, the coupling body 10 herein comprises a front part 12, an intermediate part 13 and a rear part 14 assembled together. For example, the intermediate part 13 and the rear part 14 are screwed together, with interposition of a seal 15. For example, the front part 12 is screwed into the intermediate part 13. In a variant, the parts 12 and 13, or the parts 12 and 14, or the parts 13 and 14, or the parts 12, 13 and 14, could be assembled differently or formed by only a single integral part.

The coupling body 10 is coupled to the duct 99 via the rear part 14, the duct 99 herein being received coaxially with the axis X10 inside the rear part 14, e.g. by being attached thereto by screwing, so as to come out into the inner conduit 11.

The coupling body 10 comprises a front tapered portion 16, herein formed by the outer radial surface of the front part 12. The tapered portion 16 is arranged along the forward direction AV1 with respect to the intermediate portion 13. The tapered portion 16 is centered on the fitting axis X10 and is oriented outwards. In such embodiment, the tapered portion 16 diverges along the forward direction AV1, i.e. diverging from the axis X10 along the forward direction AV1. The tapered portion 16 is oriented along the rearward direction AR1. For example, the tapered portion 16 defines an opening half-angle A16 measuring between 3 and 10 degrees, preferably 5 degrees. The half-angle A16 is the angle made by the tapered portion 16 with respect to the axis X10. The half-angle A16 is constant over the entire length of the tapered portion 16.

The intermediate part 13 comprises, successively in the opposite direction to the direction AV1, portions 18, 19 and 20 with different diameters. The intermediate part 13 is linked to the front part 12 via the portion 18, herein by screwing. The intermediate part 13 is connected to the rear part 14 via the portion 20, herein by screwing. The portion 18 herein has a smaller inner diameter than the portion 19 and the portion 19 has a smaller inner diameter than the portion 20. The portion 18 herein has a smaller outer diameter than the portion 19 and the portion 19 has a smaller outer diameter than the portion 20.

At a junction between the portions 18 and 19, the intermediate part 13 has two ports 17, i.e. two openings.

The barrel body 60 is mounted around the inner conduit 11, around an outer radial surface 21 of the body of the coupling 10, at least partially around the tapered portion 16. The outer radial surface 21 is delimited by the outer radial surfaces of the intermediate part 13 and of the front part 12. Each barrel body 60 is received in an inner volume 71. The inner volume 71 is delimited radially inwards by the coupling body 10, more particularly the outer radial surface 21 and the tapered portion 16 thereof, and, radially outwards, by the support ring 70. The barrel body 60 is movable in translation with respect to the body 10, along the axis X10, inside the inner volume 71. The outer radial surface 21 radially guides the barrel body 60 during the longitudinal displacement thereof with respect to the body 10. More generally, the ports 17 are formed through the coupling body 10 so as to come out into the inner conduit 11 and into the inner volume 71. In other words, each port 17 links the inner volume 71 and the inner conduit 11. The coupling element 1 comprises a first spring 61 which forms an elastic return member and which applies an elastic force returning the barrel body 60 along the forward direction AV1. To this end, the first spring 61 is advantageously a compression spring which is interposed longitudinally between the coupling body 10, e.g. the intermediate part 13, and the barrel body 60.

The barrel body 60 delimits openings 62. As many openings 62 as clamping tabs 50 are provided, herein eight openings 62 and eight clamping tabs 50. Each opening 62 receives one of the clamping tabs 50. Each opening 62 has a rectangular cross-section. Each opening 62 crosses radially through the barrel body 60. Each opening 62 opens out inwards at the tapered portion 16. The tabs 50 and hence the opening 62 thereof are regularly distributed about the axis X10.

Figure 6:
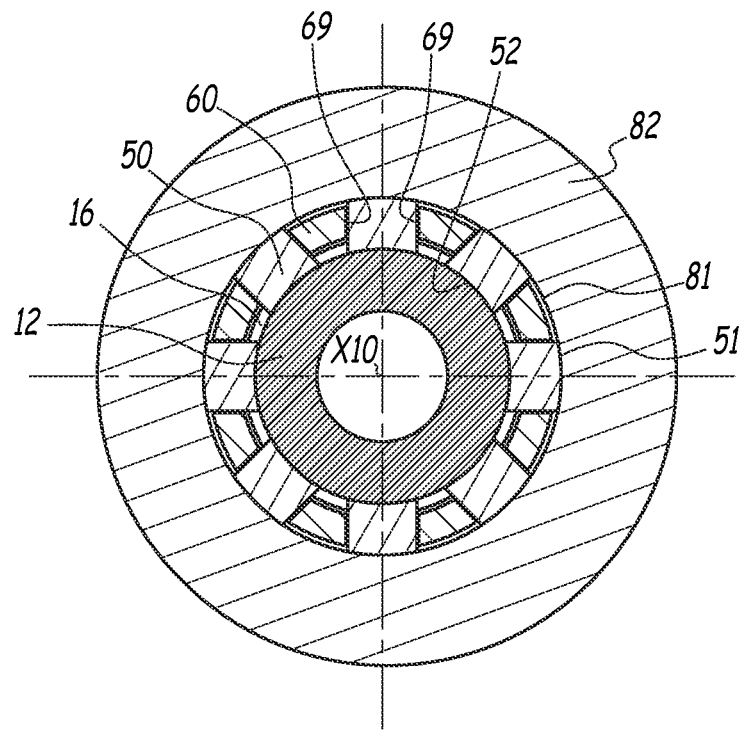
FIG. 6 is a transverse section of the coupling element according to the plane VI-VI shown in FIG. 5.

The tabs 50 being received in the respective opening 62 thereof, same are movable integrally with the barrel body 60, for a translation along the axis X10 with respect to the body 10. On the other hand, the clamping tabs 50 are movable with respect to the barrel body 60, in the respective opening 62 thereof, radially with respect to the axis X10. For each opening 62, the barrel body 60 comprises two parallel orthoradial walls 69, visible in particular in FIG. 6, which circumferentially delimit the opening 62, and two parallel axial walls 67 and 68 which longitudinally delimit the opening 62. The walls 67, 68 and 69 guide the radial displacement of the tabs 50 with respect to the barrel body 60. Each of the axial walls 67 and 68 is able to come into contact with the tabs 50 parallel to the axis X10, so that the axial position of the tabs 50 corresponds to the axial position of the barrel body 60. Each of the orthoradial walls 69 is able to come into contact with the tabs 50, so as to guide the radial movement of the tabs 50.

Each clamping tab 50 is in contact with the tapered portion 16. Depending on the position of the tabs 50 with respect to the body 10 along the axis X10, the radial displacement of the tabs 50 is bounded by the tapered portion 16 which imposes on the tabs 50, a radial displacement progressively outwards as the tabs 50 are displaced axially along the forward direction AV1. In other words, the tabs 50 are displaced in radial translation with respect to the barrel body 60 by mechanical cooperation of the tabs 50 with the tapered portion 16. Thereby, the clamping tabs 50 have a longitudinal movement and a radial movement in contact with the tapered portion 16 between an initial position, or stop position, in the uncoupled configuration of the coupling element, and a withdrawal position, and then between the withdrawal position and a clamping position.

Figure 3:
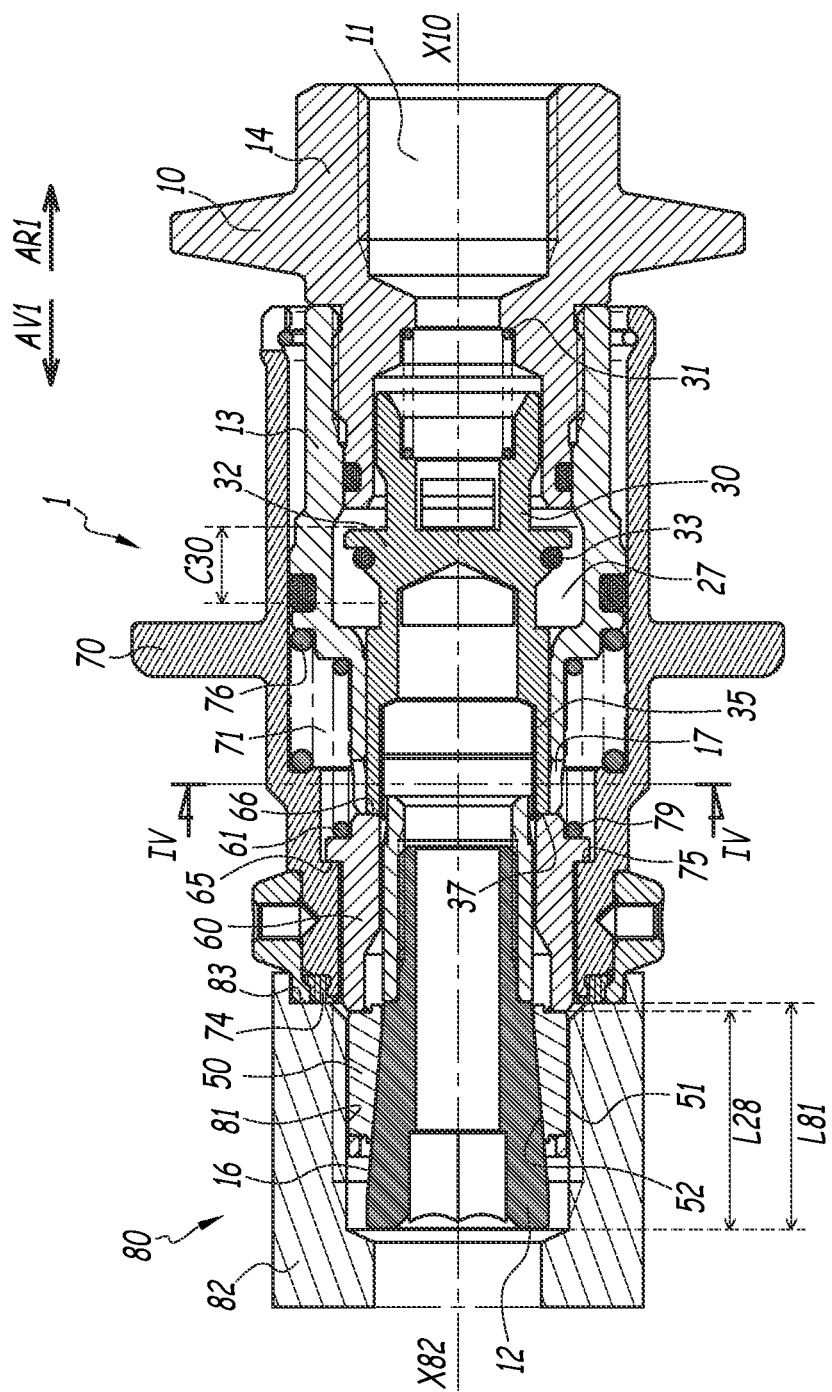
FIG. 3 is a view similar to the view of FIG. 1, wherein the coupling element is in a withdrawal configuration.

More particularly, the clamping tabs 50 are movable with respect to the barrel body between inner radial withdrawal positions, one of which is shown in FIG. 3, and outer radial clamping positions, two of which are shown in FIGS. 5 and 7, and which depend on the interface diameter of the terminal 80 which is coupled with the coupling element 1. When the tabs 50 are in the radial withdrawal position, the coupling element 1 is in a withdrawal configuration. When the tabs 50 are in one of the radial clamping positions and cooperate with the terminal 80, the coupling element 1 is in a coupled configuration. From the radial withdrawal position thereof to the radial clamping position thereof, the tabs 50 cooperate with the coupling body 10 by contact with the tapered portion 16.

In order to cooperate mechanically with the tapered portion 16, each clamping tab comprises an inner heel 52, with a tapered inner surface of shape matching the tapered portion 16 of the coupling body 10. The inner heel 52 is arranged radially inwards with respect to the barrel body 60. More particularly, the inner heel 52 is arranged in an opening, delimited by the barrel body 60 and within which the tapered portion 16 extends, the barrel body 60 being annular. Preferably, the longitudinal dimension of the inner heel 52 is longer than the longitudinal dimension of the opening 62 receiving the tab 50, so that the inner heel 52 cooperates with an inner abutment surface 64 of the barrel body 60, the inner abutment surface 64 delimiting the opening of the barrel body 60 and facing radially towards the tapered portion 16. Thereby cooperating, the inner heel 52 and the inner abutment surface 64 form an abutment against the outward radial displacement of the tab 50 in the opening 62 thereof. The tab 50 thereby comes into abutment when same reaches an outer radial position called the "initial radial position" or the "radial abutment position", taken for a uncoupled configuration of the coupling element 1, shown in FIG. 1.

The barrel body 60 has an outer radial surface 63 which is radially oriented opposite from the inner abutment surface 64. The openings 62 radially cross through the barrel body from the outer radial surface 63 to the inner radial surface 64. In front of the tabs 50, the outer radial surface 63 has a diameter smaller than the diameter of the inner interface 81 belonging to the terminal 80. Each clamping tab 50 has an outer surface 51 with a cylindrical shell, visible in particular in FIGS. 1, 3, 5 and 6. Each outer surface 51 is oriented in a radial direction opposite the inner heel 52, and therefore the tapered portion 16. By means of this surface 51, the clamping tab 50 is designed to cooperate mechanically with the inner interface 81, which has a cylindrical shell complementary to the outer surface 51. The interface 81 and/or the outer surface 51 can have a respective thread matching each other. The interface 81 and/or the outer surface 51 can have a surface treatment, produced e.g. by laser grooving, thereby increasing the mutual coefficient of friction thereof.

As shown in FIG. 1, in the uncoupled configuration, the tabs 50 emerge from the barrel body 60 radially outwards. More particularly, each tab 50 has a front face 53, i.e. oriented along the forward direction AV1, and a part of which emerges radially from the barrel body 60, in the uncoupled configuration. More particularly, a part of the front face 53 emerges radially from the outer surface 63 of the barrel body 60 arranged ahead of the tabs 50. The emergent part of the front face 53 of each tab 50 then faces a mouth 23 of the coupling element, parallel to the axis X10. In other words, the emergent part of each front face 53 is oriented along the direction AV1, without any part of the coupling element 1 being interposed between the emergent part and the front of the coupling element 1, up to the mouth 23. The mouth 23 is defined at a longitudinal end of the coupling element 1 which is opposite another longitudinal end receiving the duct 99. For each tab 50, the front face 53 delimits the outer surface 51 along the forward direction AV1. More particularly, in the uncoupled configuration, the cylindrical shell outer surfaces 51 of the tabs 50 together delimit around the tabs 50 a virtual cylinder, the diameter of which is greater than the diameter of the outer surface 63 of the barrel body 60, ahead of the tabs 50. The diameter of the virtual cylinder is then also greater than the maximum interface diameter of the inner interface 81.

In the uncoupled configuration, the barrel body 60 advantageously protrudes forwards from the body 10. During coupling and uncoupling, the displacement of the barrel body 60 along the rearward direction AR1 is bounded by the coupling body 10. To this end, as shown in FIG. 3, the barrel body 60 abuts e.g. along the rearward direction AR1, against a front surface 79 of the body 10, situated longitudinally at the ports 17, herein at the junction between the portions 18 and 19. Herein, the abutment occurs via a rear surface 66 belonging to the barrel body 60.

Through the ports 17, the inner conduit 11 communicates radially with the inner volume 71 arranged radially between the coupling body 10 and the support ring and wherein at least the rear part of the barrel body 60 is housed. The inner conduit 11 and the inner volume 71 communicate along the longitudinal direction through the ports 17.

In general, as shown in FIG. 3, a maximum gripping length L28, measured between a front face 28 of the front part 12 of the body 10 and a rear end of the cylindrical outer surface 51 of the tabs 50, when the barrel body 60 is in rear abutment against the coupling body 10, which happens when the coupling element 1 is in the withdrawal configuration, is compatible with the inner dimensions of the terminal, and in particular the interface 81. The front face 28 is formed more particularly at the front of the tapered portion 16.

The support ring 70 is an outer ring which surrounds the barrel body 60, the tabs 50 and the coupling body 10. The support ring 70 is movable in translation with respect to the coupling body 10 and with respect to the barrel body 60 along the fitting axis X10. A seal 72 is interposed between an outer surface of the coupling body 10, herein at the front of the portion 20 of the intermediate part 13, and an inner radial face 73 of the support ring 70. The seal 72 is interposed between the body 10 and the ring 70 in all the longitudinal positions taken by the support ring 70 with respect to the body 10 during coupling and uncoupling. In other words, the support ring 70 is in radial sealing with the body 10. A front seal 74 is housed at a front end of the support ring 70.

The support ring 70 comprises a rear inner surface 75 and the barrel body 60 comprises a front surface 65 formed on an outer shoulder of the barrel body 60. As shown in FIG. 3, the rear inner surface 75 is able to cooperate mechanically with the front surface in order to drive the barrel body 60 along the rearward direction AR1, towards the axial withdrawal position thereof, and therefore in order to drive the tabs 50 along the rearward direction AR1, so that the tabs 50 adopt the inner radial withdrawal position thereof by cooperation with the tapered portion 16, the inner radial withdrawal position corresponding to the axial withdrawal position of the barrel body 60 and of the tabs 50.

The coupling element 1 comprises a second spring 76, which applies an elastic return force on the support ring 70 along the forward direction AV1, for returning the ring 70 along the forward direction AV1. For example, the spring 76 is a compression spring, which is interposed longitudinally between the coupling body 10 and the support ring 70.

Preferably, the spring 76 is arranged inside the ring 70 around the first spring 61. The coupling body 10, e.g. the intermediate part 13, forms an abutment 24 against the displacement of the support ring 70 along the forward direction AV1, when the coupling element 1 is in the uncoupled configuration as shown in FIG. 1.

The valve 30 is mounted apt to move longitudinally, with respect to the coupling body 10, between a forward closed position, shown in FIG. 1 and taken in the uncoupled configuration of the coupling element, and rear open positions, shown in FIGS. 3, 5 and 7 and taken in particular in the coupled configuration of the coupling element 1. The valve 30 is received in the inner conduit 11. The coupling element 1 comprises a third spring 31 which returns the valve 30 along the forward direction AV1. For example, the third spring 31 is a compression spring, which is interposed axially between the valve 30 and the body more particularly the rear part 14.

The valve 30 comprises a solid central portion 32. The solid central portion 32 delimits, along with the inner conduit 11, a passage 27 for the fluid F. In the forward closed position of the valve 30, the passage 27 is minimal and smaller than in the rear open position of the valve 30 in the coupled configuration. In such embodiment, in the forward closed position of the valve 30, the valve 30 abuts against a seat 25 formed by the coupling body 10, behind the ports 17. Such abutment closes the passage 27. Herein, the seat 25 is formed at a junction between the portion 19 and the portion 20 of the intermediate part 13. The abutment of the valve 30 against the coupling body 10 takes place via a sealing joint 33 between the valve 30 and the body 10, so that the closure of the passage 27 and hence of the inner conduit 11 is sealed. Preferably, the seal 33 is supported by the valve 30, being housed in the solid central portion 32, and abuts against the seat 25. In the open position of the valve 30, as shown in FIGS. 5 and 7, the fluid F can pass through the inner conduit 11 around the solid portion 32 of the valve 30.

The valve 30 comprises a front skirt 34. The front skirt 34 extends along the forward direction AV1 from the solid central portion 32. The valve 30 comprises a rear skirt 36 extending along the rearward direction AR1 from the solid central portion 32. The displacement of the valve 30 with respect to the body 10 is ensured by sliding the valve 30 within the body 10. In the example, from the open position to the closed position of the valve 20, an outer radial surface of the front skirt 34 cooperates with a small radial play with a cylindrical inner surface 26 of the coupling body and an outer radial surface of the rear skirt 36 cooperates with a small radial play with a cylindrical inner surface 29 of the coupling body 10, so as to radially guide the valve 30 in the longitudinal movement thereof between the forward position and the rear position. The inner radial surfaces 26 and 29 are advantageously centered on the axis X10. The inner radial surface 26 is advantageously formed by the portion 19 of the part 13. The inner radial surface 29 is advantageously formed by the rear part 14.

The third spring 31 is interposed between a rear surface of the rear skirt 36 of the valve 30 and a front surface of the rear part 14 of the coupling body 10, herein arranged in the inner conduit 11.

Figure 4:
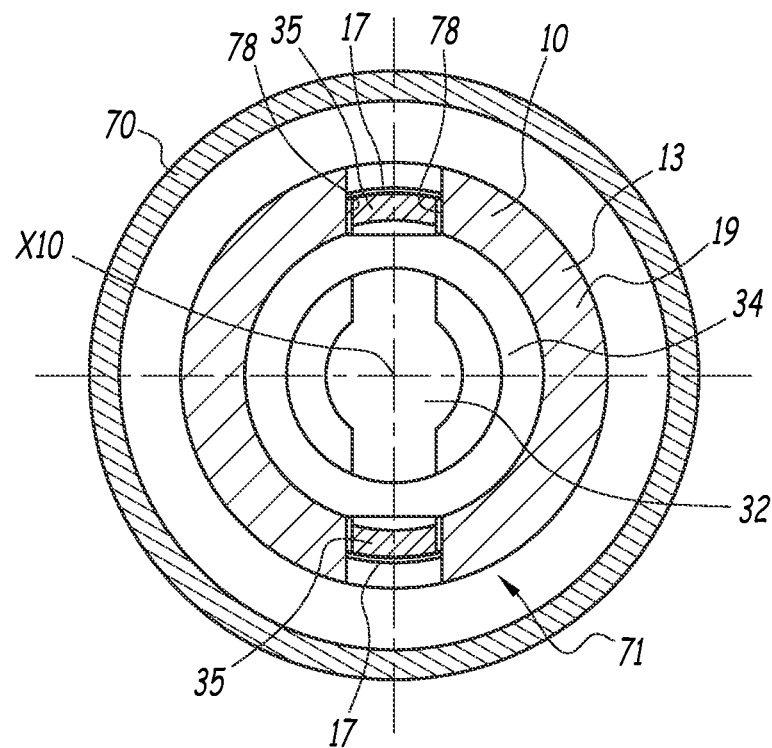
FIG. 4 is a transverse section of the coupling element along the section plane IV-IV shown in FIG. 3.

Along the forward direction AV1, the front skirt 34 continues by two longitudinal lugs 35, which extend parallel to the axis X10 forwards, which are distributed at 180° from each other about the axis X10 and which form a front end of the valve 30. The longitudinal lugs 35 are engaged in the ports 17 of the coupling body 10, at least when the coupling element 1 is in the coupled configuration. The lugs 35 thus extend partially into the inner volume 71. The lugs 35 cross longitudinally through the ports 17 from the inner volume 71 into the inner conduit 11, where the lugs are attached to the front skirt 34. The circumferential dimensions of the ports 17 of the coupling body 10 correspond to the circumferential dimensions of the longitudinal lugs 35. Thereby, the longitudinal movement of each lug 35 between the uncoupled configuration and the coupled configuration is guided by opposite guide surfaces 78, herein orthoradial and parallel, visible in FIG. 4 and apt to come into contact with the lug 35. The guide surfaces 78 belong to the coupling body 10 and circumferentially delimit the port 17 wherein the lug 35 is engaged.

The longitudinal lugs 35 each have a respective front end surface 37. The front end surfaces 37 are directed along the forward direction AV1, facing the rear surface 66 belonging to the barrel body 60. Herein, the rear surface 66 forms precisely a rear end of the barrel body 60. In the uncoupled configuration, the valve 30 is in the forward closed position, in forward abutment against the body 10 via the seal 33, and there is a longitudinal play J35 between the front end surfaces 37 of the longitudinal lugs 35 and the rear surface 66 of the barrel body 60. In other words, the lugs are disengaged longitudinally from the barrel body and from the tabs.

The longitudinal lugs 35 are means of transmission, which are interposed between the valve 30 and the barrel body 60. Herein, the means of transmission are formed directly by the valve 30, namely by the lugs 35. When the coupling element 1 moves between the uncoupled configuration and the coupled configuration, the barrel body 60 drives the valve 30 by means of the lugs 35, from the forward closed position to the rear open position, where the valve 30 opens the inner conduit 11.

An advantage is that the direct axial mechanical cooperation between the barrel body 60 and the valve 30, obtained when the means of transmission are integral either with the barrel body 60 or with the valve 30 as is the case herein, reduces the number of parts of the coupling element 1. In fact, it is advantageously not necessary to provide additional parts for specifically forming the means of transmission.

Moreover, the longitudinal geometry of the means of transmission, herein in the form of the longitudinal lugs 35, reduces the longitudinal dimensions of the ports 17 formed in the coupling body 10. Indeed, the longitudinal dimensions do not depend on the travel and on the displacement of the valve 30 with respect to the coupling body 10. A better mechanical resistance of the coupling body 10 is then obtained.

Preferably, the first spring 61 is arranged radially around the longitudinal lugs 35 of the valve 30 and around the intermediate part 13 of the coupling body 10. Preferably, the first spring 61 surrounds the rear end of the barrel body 60.

Thus, the first spring 61 is guided radially by the barrel body 60 and by the intermediate part 13.

During a first coupling phase, the terminal 80 and the coupling element 1 are arranged for aligning the axes X10 and X82. At the above moment, the coupling element 1 is in the uncoupled configuration, as shown in FIG. 1.

The coupling body 10 and the terminal 80 are then brought closer together along the fitting axis X10. The terminal 80 engages around the barrel body 60 and the front face 83 thereof comes into contact with the front seal 74 of the support ring 70. The front seal 74 then provides, along with the radial seal 72, a fluidic sealing between the inside and the outside of an assembly consisting of the coupling element 1 and the terminal 80. The front face 83 also abuts against the emergent part of the front face 53 of the tabs 50. The continuation of the fitting movement along the fitting axis X10 drives the tabs 50, hence the barrel body 60, and the support ring 70 along the rearward direction AR1, with respect to the body 10. The tabs 50 drive the barrel body 60 via the wall 68. During such movement of the barrel body 60 along the rearward direction AR1, the tabs 50, under the effect of the fitting movement of the terminal 80 and in cooperation with the tapered portion 16, move radially inwards, towards the radial withdrawal position thereof, in the respective opening 62 thereof, until the tabs 50 are arranged inside a virtual cylinder, the diameter of which is less than the diameter of the inner interface 81. The terminal 80 can then surround the tabs 50, without rubbing, or with little rubbing, and progress along the rearward direction AR1 with respect to the tabs 50 and to the coupling body 10, until the support ring 70 arrives into abutment against the front surface 65 of the barrel body 60. As shown in FIG. 3, the rearward movement of the barrel body 60 with respect to the coupling body 10 is limited by the rear abutment of the barrel body 60 against the intermediate part 13 of the coupling body 10. In FIG. 3, the coupling element 1 is in a withdrawal configuration. In the withdrawal configuration, the tabs 50 reach the radial withdrawal position thereof which is radially distant from the interface 81 so that the interface 81 is free from any mechanical cooperation with the tabs 50.

When the fitting force is released, the first spring 61 pushes back the barrel body 60 along the direction AV1, in forward abutment against the tabs 50, via the wall 68. Thereby, the tabs 50, by mechanical cooperation with the tapered portion 16, are pressed radially outwards in contact with the interface 81 of the terminal 80, which is radially opposite the outer surface 51 of the tabs 50.

The clamping tabs 50 cooperate with the barrel body 60 in the radial outward movement thereof from the withdrawal position to the clamping position, the first spring 61 pushing the barrel body 60 into forward abutment against the tabs 50 between the withdrawal configuration of the coupling element 1 and the coupled configuration of the coupling element 1 and in the coupled configuration of the coupling element 1.

During coupling, during the displacement of the barrel body 60 along the rearward direction AR1, after a lost motion at the beginning of coupling over the length corresponding to the longitudinal play J35, the rear surface 66 of the barrel body 60 comes into contact with the longitudinal lugs 35. The lugs 35 are then engaged longitudinally with the barrel body 60 and the displacement along the rearward direction AR1 of the barrel body 60 with respect to the coupling body 10 is accompanied by a displacement along the rearward direction AR1 of the valve 30 with respect to the coupling body 10, towards an open position of the valve 30. As such, the longitudinal lugs 35 form the means of transmission, which are rigidly attached to the valve 30 and integral with the valve 30. Such means of transmission enable the barrel body 60 to drive the valve 30 from the forward position thereof to the rear position thereof, between the uncoupled configuration and the coupled configuration of the coupling element 1. As explained hereinabove, the means of transmission are received at least partially in the ports 17, which makes possible the transmission of the movement between the barrel body 60, arranged around the body 10, to the valve 30, arranged mostly inside the body 10. When the barrel body 60 is returned along the forward direction AV1 by the first spring 61, the valve 30 follows such forward movement, as such pushed back into forward abutment against the rear surface 66 of the barrel body 60 by the third spring 31, until reaching the open position during coupling or until reaching the forward closed position during uncoupling.

As shown in FIG. 5, in the coupled configuration, the valve 30 has a position offset along the rearward direction AR1 with respect to the forward closed position thereof and the passage 27, which was minimal between the coupling body 10 and the valve 30 in the inner conduit 11 so that same can be closed by the seal 33 in the uncoupled configuration (as shown in FIG. 1), is increased. In the coupled configuration, the inner volume 71 communicates fluidically with the inner conduit 11 through the ports 17. The inner volume 71 is thus subject to the pressure of the fluid F present in the inner conduit 11. Since a sealing diameter between the support ring 70 and the terminal 80, herein at the front seal 74, is smaller than a sealing diameter between the inner radial face 73 of the support ring 70 and the coupling body 10, herein at the seal 72, the support ring 70 is pushed along the forward direction AV1 with respect to the coupling body 10 against the terminal 80, which enhances the sealing of the front seal 74 against the terminal 80.

In the coupled configuration, the longitudinal lugs 35 are engaged longitudinally with the barrel body 60 and with the valve 30.

In the coupled configuration where the tabs are in the radial clamping position, the interface 81 covers at least partially the tabs 50 and the tabs 50 cooperate mechanically with the interface 81 so as to prevent the withdrawal of the terminal 80, i.e. so as to prevent the interface 81 from completely uncovering the tabs 50. The barrel body 60 is held in the axial clamping position, in abutment towards the front against the tabs 50 via the wall 68, by the first spring 61. The lugs 35 extend longitudinally in the ports 17 from the inner volume 71 to the inner conduit 11.

For the uncoupling, the terminal 80 is first pushed further along the rearward direction AR1 of the coupling element 1. Alternatively or jointly, the support ring 70 is driven along the rearward direction AR1 with respect to the body 10, in such a way that the support ring 70 comes into rear abutment against the barrel body 60 and thereby drives the barrel body 60 into rear abutment against the tabs 50, via the wall 67. The tabs 50 are thereby driven along the rearward direction AR1 by the barrel body 60. The support ring 70 then forms a maneuvering ring. In other words, for the present embodiment, the same ring 70 forms herein both the support ring and the maneuvering ring. In any case, when the support ring 70 is in rear abutment against the barrel body 60, the tabs 50 follow the axial movement of the support ring 70 along the rearward direction AR1 of the barrel body 60, and, by mechanical cooperation with the tapered portion 16, move radially inwards towards the radial withdrawal position thereof, until the tabs 50 are arranged inside a virtual cylinder, the diameter of which is less than the diameter of the interface 81. In other words, in the withdrawal position, the tabs 50 are radially distant from the interface 81, whereas the interface 81 surrounds same. The interface 81 is then disengaged from any mechanical cooperation with the tabs 50, so that the terminal 80 can be withdrawn from the coupling element 1, i.e. can completely uncover the outer radial surface 51 of the tabs 50.

During the displacement of the barrel body 60 along the rearward direction AR1, the valve 30, in forward abutment against the barrel body 60 by means of the longitudinal lugs 35, follows the longitudinal movement of the barrel body 60 along the rearward direction AR1. The clamping tabs 50 cooperate with the barrel body 60 in the radial inward movement thereof, from the clamping position to the withdrawal position, the barrel body 60 then being in rear abutment against the tabs 50.

When the terminal 80 has been removed and the technician releases the support ring 70, since when the barrel body 60 is returned along the forward direction AV1 by the first spring 61, the valve 30, subject to the third spring 31, follows the movement of the barrel body 60 until the valve 30 reaches the closed position. The valve 30, since it is elastically returned to the forward closed position by the spring 31, reinforces the clamping of the tabs 50 on the interface 81 in the coupled configuration.

From the uncoupled configuration to the coupled configuration and/or from the coupled configuration to the uncoupled configuration, the valve 30 has overtraveled along the rear direction AR1, reaching the position which was temporarily taken when the coupling element 1 passed through the withdrawal configuration, e.g. the withdrawal configuration shown in FIG. 3

Along the axis X10, the valve 30 travels through a stroke C30 called "maximum travel", from the uncoupled configuration shown in FIG. 1 to the withdrawal configuration with the barrel body 60 in rear abutment against the body 10, shown in FIG. 3. The valve 30 makes a displacement L30 from the uncoupled configuration shown in FIG. 1 to the coupled configuration, e.g. The configuration shown in FIG. 7 with the terminal 80", the interface diameter of which is maximum. The maximum travel C30 is strictly greater than the displacement L30. The maximum travel C30 for any terminal 80 and the displacement L30 with the terminal 80" of maximum interface diameter are strictly greater than a length L17 of the ports 17. The length L17 is the smallest distance, taken parallel to the axis X10, between two front and rear axial surfaces delimiting each port 17.

For a given terminal 80, the radial clamping position of the tabs 50 is an intermediate radial position between the initial radial position and the withdrawal radial position, in particular the withdrawal radial position with the barrel body 60 in rear abutment against the body 10. The barrel body 60 and the tabs 50 are movable longitudinally with respect to the coupling body 10 correspondingly between an initial forward position, called "axial abutment position", shown in FIG. 1, corresponding to the uncoupled configuration, an intermediate position, rearwards along the X10 axis with respect to the initial position, called "axial clamping position", which depends on the interface diameter, corresponding to the coupled configuration, and a rear position, called "axial withdrawal position", more particularly the axial withdrawal position shown in FIG. 3 with the barrel body 60 in rear abutment against the body 10. An example of an axial clamping position, corresponding to a minimum interface diameter, is shown in FIG. 5. Another example of an axial clamping position, corresponding to a maximum interface diameter, is shown in FIG. 7. The larger the interface diameter, the more advanced the axial clamping position of the barrel body 60 and of the tabs 50. With respect to the position thereof taken with respect to the body 10 when the tab 50 is in the initial position, the cooperation surface 51 of each tab 50 in the clamping position is in a position offset radially inwards and offset longitudinally along the rearward direction AR11.

An advantage of the presence of a dead stroke of the barrel body 60, due to the longitudinal play J35 between the barrel body 60 and the valve 30 in the uncoupled configuration, is to ensure that in the uncoupled configuration, the valve 30 is disengaged longitudinally from the barrel body 60 and thus the closed position is uncoupled from the axial abutment position of the tabs 50. The longitudinal play J35 preferably remains less than or equal to 20% of the maximum travel C30, more particularly less than or equal to 15% of the maximum travel C30.

In a variant, it is possible to arrange for the lugs 35 of the valve 30, rather than mechanically cooperating with the barrel body 60, each cooperate with the surface of the tabs 50 so that the tabs 50 drive the valve 30 towards the rear open position. More generally, the invention provides for the means of transmission to be interposed between the valve 30 and a drive element, between the barrel body 60 and at least one of the clamping tabs 50, so that the drive element can drive the valve 30 via the means of transmission, from the forward position to a rear position, where the valve opens the inner conduit, when the coupling element 1 changes from the uncoupled configuration to the coupled configuration.

In a variant, provision can be made for the tabs to have longitudinal lugs as means of transmission which abut against the valve in order to push the valve back. The longitudinal lugs then have longitudinal movement and a radial movement between the abutment position and the withdrawal position and between the withdrawal position and the clamping position.

Figure 8:
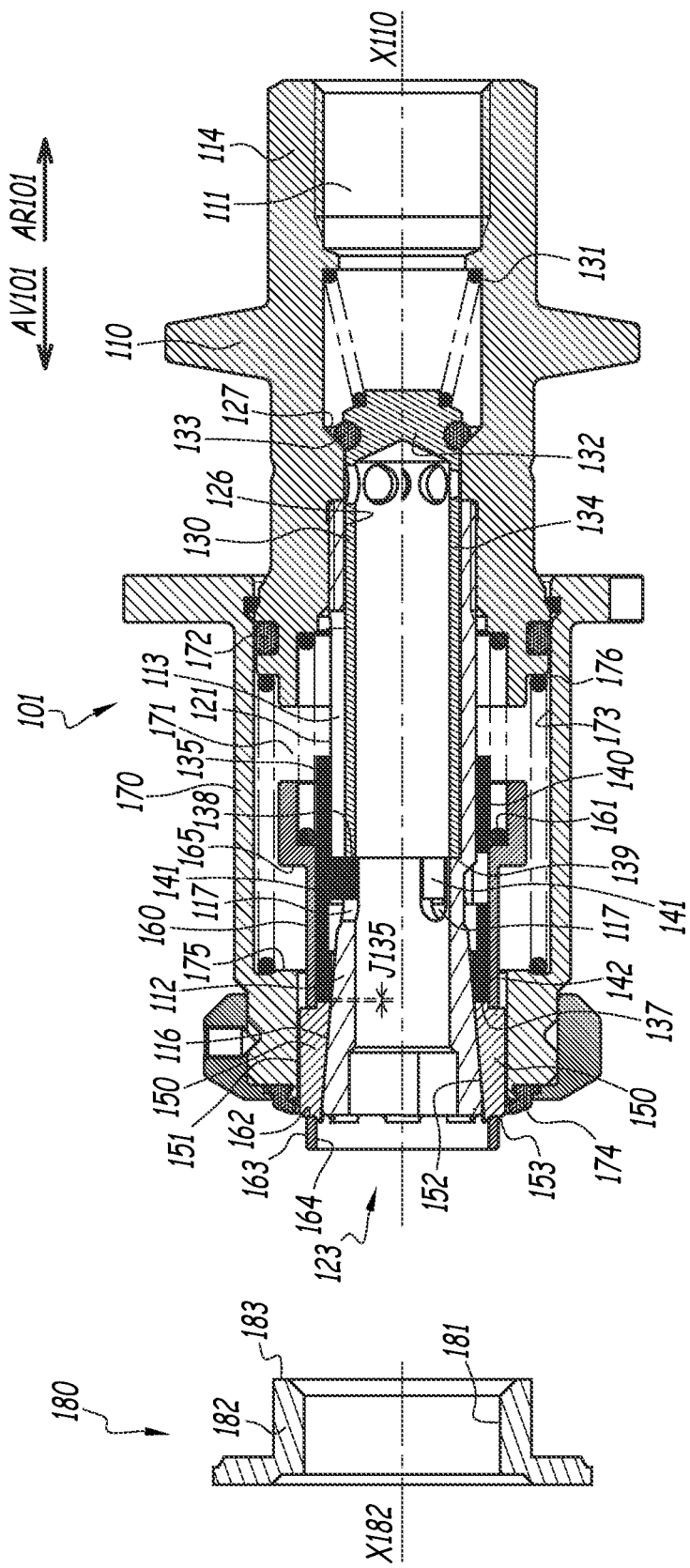
FIG. 8 is a longitudinal section of a coupling element according to a second embodiment of the invention, shown in an uncoupled configuration, where the coupling element is uncoupled from a terminal.
Figure 9:
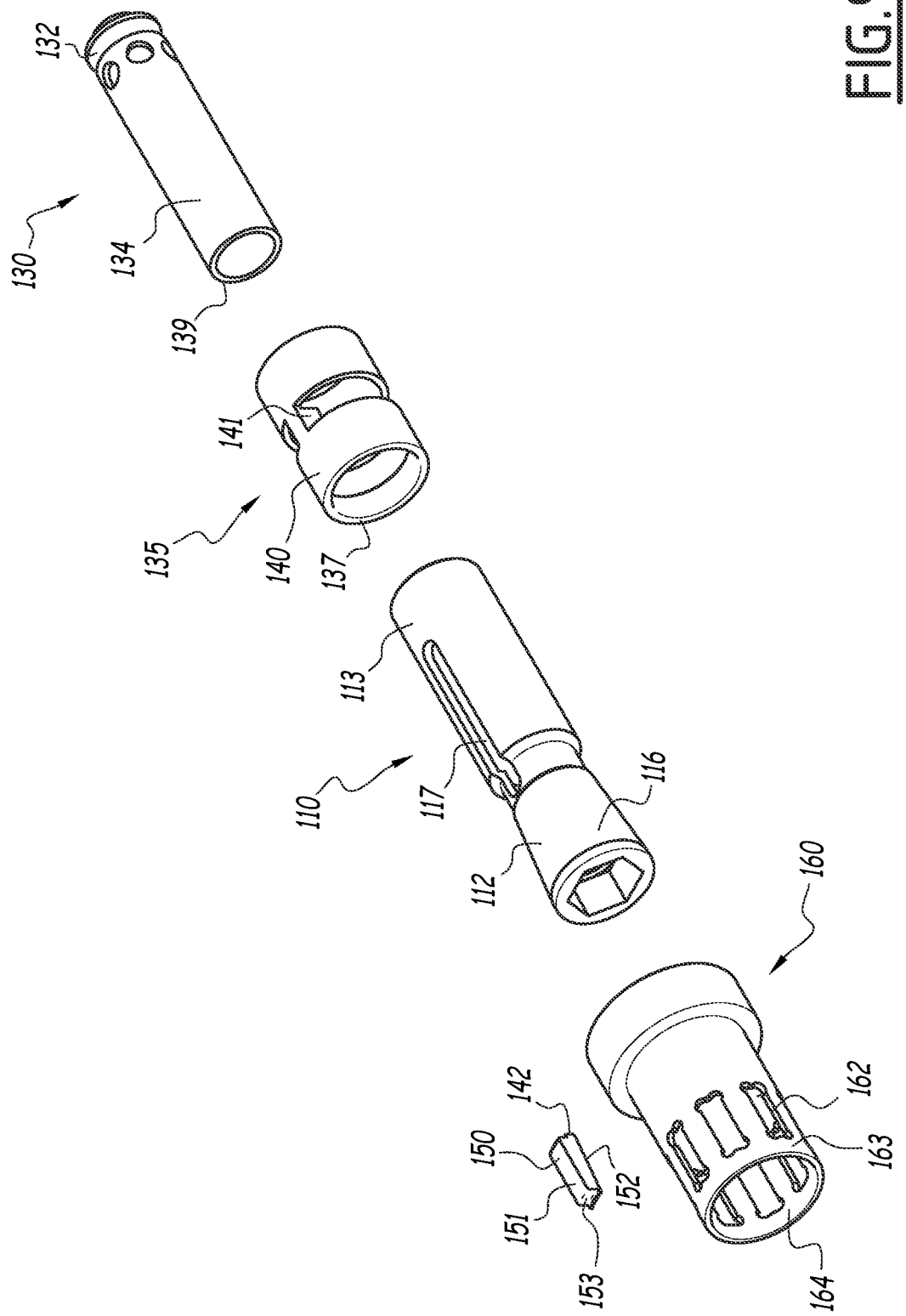
FIG. 9 is an exploded perspective view of the coupling element shown in FIG. 7.
Figure 10:
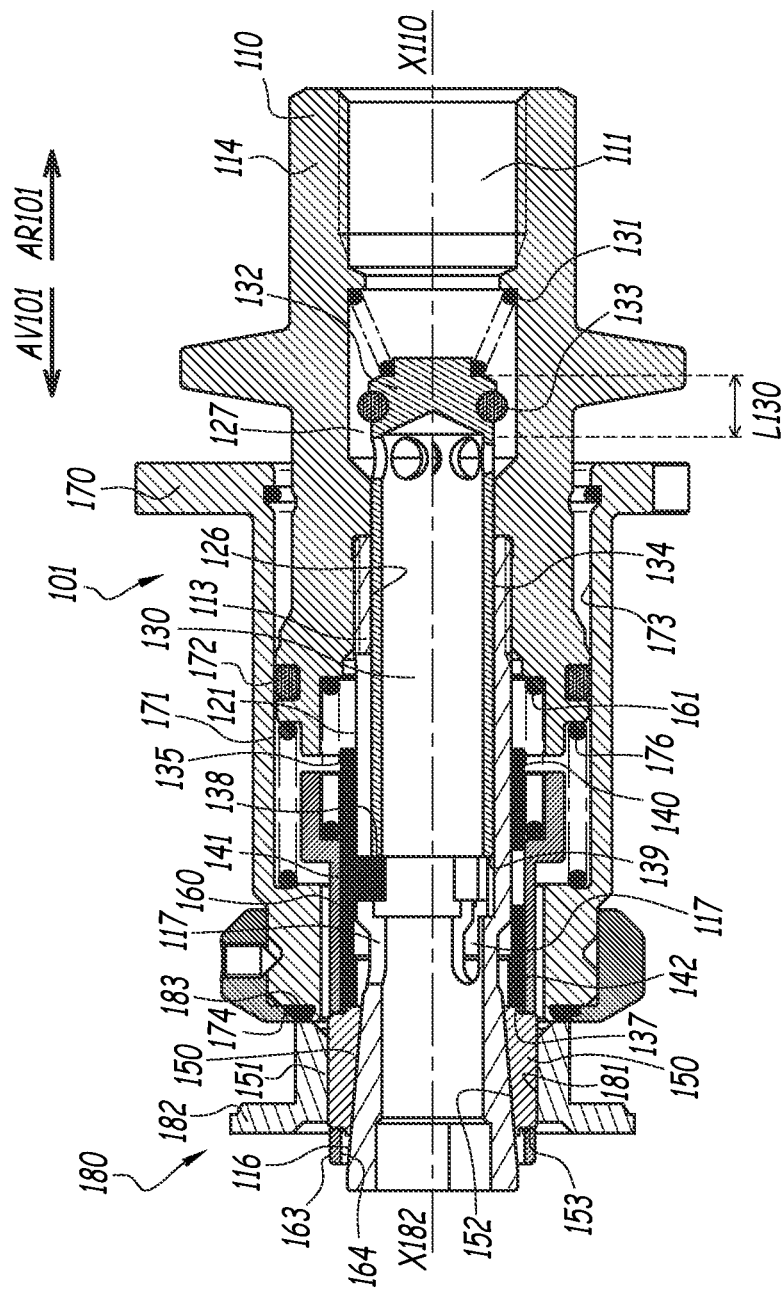
FIG. 10 a section similar to the section shown in FIG. 8, wherein the coupling element is shown in a coupled configuration, where the coupling element is coupled to the terminal.

FIGS. 8 to 10 show a coupling element 101, to be coupled to a terminal 80, according to another embodiment. Except for the main differences mentioned hereinbelow, the coupling element 101 and the terminal 180 have a similar structure and functioning to the coupling element 1 and to the terminal 80 and are intended for a similar use.

The coupling element 101 comprises a coupling body 110, a valve 130, clamping tabs 150, a barrel body 160 and a support ring 170. Herein again, the valve 130 and the barrel body 160 are distinct.

A fitting axis X110 is defined which is fixed with respect to the coupling body 110 and on which the coupling body 110 is centered. A forward direction AV101, parallel to the axis X110, is defined and is directed from the coupling element 1 towards the terminal to be coupled. A rearward direction AR1 is defined, in the opposite direction.

The terminal 180 comprises a terminal body 182, which is tubular, for conducting the flow of fluid. A central axis X182 is defined, with which the body 182 is coaxial and which is fixed with respect to the body 182. The body 182 forms an interface 181. In the present example, the interface surface 181 is internal. The interface 181 has a cylindrical shell centered on the axis X182. The interface 181 comes out onto a front face 183 of the terminal 180. When the terminal 180 and the coupling element 101 are coupled, the interface 181 is advantageously coaxial with the axis X110.

The coupling body 110, herein formed by only two assembled parts, namely a part forming a rear part 114, and a part forming both a front part 112 and an intermediate part 113. The body 110 delimits an inner conduit 111 for the circulation of the fluid, the inner conduit 111 crossing through the parts 112, 113 and 114 along the axis X110.

The rear part 114 is intended for being connected to a fluid duct similar to the duct 99 illustrated for the embodiment shown in FIGS. 1 to 7 and fastened to the part forming the parts 112 and 113, e.g. by screwing, by means of the part 113.

The front part 112 forms a front tapered portion 116, which is centered on the axis X110, diverging along the direction AV101 and oriented outwards. The front part 112 and the intermediate part 113 together form an outer radial surface 121 of the coupling body 110. An inner volume 171 is delimited radially between the support ring 170 and the outer radial surface 121.

Three ports 117, regularly distributed around the axis X110, are provided through the coupling body 110, herein through the intermediate part 113. The ports 117 emerge both into the inner conduit 111 and into the inner volume 171, at the outer radial surface 121 of the coupling body 110. The inner volume 171 communicates fluidically with the inner conduit 111 through the ports 117, in particular when the coupling element is in the coupled configuration.

The barrel body 160 is arranged around the outer radial surface 121 of the coupling body 110. The barrel body 160 is movable in translation along the axis X110 with respect to the coupling body 110.

The barrel body 160 has an inner radial surface 164 radially facing the tapered portion 116, an outer radial surface 163, as well as radial openings 162, which link the surfaces 163 and 164 and which are distributed regularly around the axis X110.

Each opening 162 receives one of the clamping tabs 150. Each opening 162 has two parallel axial walls and two parallel orthoradial walls, in a similar way to the openings 62, for guiding a radial displacement of the clamping tabs 150.

Each clamping tab 150 has an outer surface 151 with a cylindrical shell.

Within the openings 162, at coupling, the tabs 150 are radially movable with respect to the barrel body 160 and with respect to the body 110, from an initial radial position, shown in FIG. 8, to a radial clamping position shown in FIG. 10, passing through a radial abutment position (not shown). The radial displacement of the tabs 150 is achieved by mechanical cooperation of a respective inner heel 152, with which each tab 150 is provided, with the tapered portion 116 of the coupling body 110, when the tabs 150 and the barrel body 160 are translated along the axis X110.

When the coupling element 101 is in the uncoupled configuration, the tabs 150 are in the radial abutment position shown in FIG. 8. In the uncoupled configuration, the tabs 150 are in outer radial abutment against the inner abutment surface 164 of the barrel body 160, via the respective heel 152 thereof.

The tabs 150 have a front face 153. As shown in FIG. 8, in the uncoupled configuration of the coupling element 101, a part of the front face 153 emerges radially from the barrel body 160 from the outer surface 163 at the front of the tabs 150 and, thereby, axially faces a mouth 123 of the coupling element 101. More particularly, the cylindrical outer surfaces 151 of the tabs 150 together delimit a virtual cylinder, the diameter of which is greater than the diameter of the outer surface 163 of the barrel body 160, ahead from the tabs 150. The diameter of the virtual cylinder is also greater than the diameter of the inner interface 181.

The outer radial clamping position shown in FIG. 10 is obtained when the coupling element 101 is in the coupled configuration and is coupled with the terminal 180. In the radially outer clamping position, the clamping tabs 150 cooperate mechanically with the interface 181 of the terminal 180 and thereby prevent a withdrawal of the terminal 180 when the coupling element 101 is in a coupled configuration. When the tabs 150 are in the radial clamping position, the barrel body 160 is in an axial clamping position, wherein the barrel body 160 abuts against the tabs 150 along the direction AV101. The coupling element 101 comprises an elastic return member 161, namely a spring, which returns the barrel body 160 forwards, in particular towards an axial clamping position.

By means of the surface 151, the clamping tab 150 is designed for cooperating mechanically with the inner interface 181 when the coupling element 101 is in the coupled configuration. To this end, the interface 181 has a cylindrical shell matching the shells of the outer surfaces 151. Thereby, the tabs 150 retain the coupled terminal 180 via the surface 151 thereof.

When the coupling element 101 is set into the withdrawal configuration whereas the coupling element 101 was in the coupled configuration and was coupled with the terminal 180, the clamping tabs 150 reach the inner radial withdrawal position thereof. In the radial withdrawal position, the tabs 150, more particularly the outer surface 151 thereof, are disengaged radially inwards from the interface 181 of the terminal 180, thereby allowing the terminal 180 to be withdrawn from the body 110.

The valve 130 is arranged inside the body 110, more particularly inside the part 113.

The valve 130 is movable in translation with respect to the coupling body 110 inside the inner conduit 111. Under the action of a spring 131, the valve 130 is returned elastically to a forward position, where the valve 130 closes the inner conduit 111. This forward position of the valve 130 is obtained for the uncoupled configuration of the coupling element shown in FIG. 8. In the coupled configuration, the valve 130 is in a rear position, so as to open the conduit 111.

More precisely, the valve 130 comprises a solid central portion 132 and a front skirt 134. Unlike the embodiment shown in FIGS. 1 to 7, no rear skirt was provided for. In other words, the valve 130 is guided radially in a single zone, herein via the front skirt 134, and not in two axially spaced zones, as is the case for the valve 30, which is guided by the skirts 34 and 36.

The solid central portion 132 delimits, along with the inner conduit 111, more particularly at the part 114 of the body 110, a passage 127 for the fluid. In the uncoupled configuration wherein the valve 130 is in the forward position, as shown in FIG. 8, the passage 127 is smaller than in the coupled configuration wherein the valve 130 is in the rear position, as shown in FIG. 10. Thus, the reduction of the passage 127 leads to the conduit 111 being closed in the uncoupled configuration, compared to the coupled configuration wherein the conduit 111 is open. Preferably, a seal 133 is provided for closing off the passage 127 when the valve 130 is in the forward position. The seal 133 is advantageously supported by the solid central portion 132 and abuts against the rear part 114 when the valve 130 is in the forward position, in order to close off the conduit 111.

In the present example, the front skirt 134 cooperates mechanically with reduced radial play with an inner radial surface 126 of the coupling body 110, for the radial guiding of the movement of the valve 130 between the uncoupled configuration and the coupled configuration of the coupling element. The inner radial surface 126 delimits a part of the inner conduit 111. Herein, the inner radial surface 126 is formed jointly by the intermediate part 13 and the rear part 114.

The support ring 170 is mounted so as to be arranged, in the uncoupled configuration, around the barrel body 160 and the tabs 150, as shown in FIG. 8. In the present case, the support ring 170 is external to the coupling body 110.

The support ring 170 is in radial sealing with the coupling body 110. For this purpose, a seal 172 is provided herein, interposed between the rear part 114 and an inner radial face 173 of the support ring 170. Moreover, the inner radial face 173 delimits the inner volume 171.

The support ring 170 includes a front seal 174 which comes into axial contact with the front face 183 of the terminal 180 so as to provide an axial sealing between the terminal 180 and the support ring 170, in particular in the coupled configuration, and also during the coupling.

The coupling element 101 comprises a spring 176 which applies an elastic return force to the support ring 170 along the forward direction AV101 in order to bring the ring 170 along the forward direction AV101 with respect to the body 110. For example, the spring 176 is a compression spring interposed longitudinally between the coupling body 110 and the support ring 170. Preferably, the spring 176 is arranged inside the ring 70 around the spring 161.

In such embodiment, the support ring 170 serves as a maneuvering ring that can be actuated by a technician for setting the coupling element 101 in the withdrawal configuration, while the coupling element 101 was in the coupled configuration and was coupled with the terminal 180. In other words, only one ring 170 serves both as a support ring and as a maneuvering ring. To act as a maneuvering ring, the support ring 170 is able to drive the tabs 150 from the radial clamping position to the radial withdrawal position, in that the support ring 170 drives the barrel body 160 from the axial clamping position to the axial withdrawal position when the support ring 170 is moved to the rear position thereof. To this end, provision is made for a rear inner surface 175 of the support ring 170 to abut rearwards against a front surface 165 of the barrel body 160, the support ring 170 thereby driving the barrel body 160 rearwards.

Unlike the coupling element 1, the coupling element 101 comprises a transmission ring 135 which is distinct from the valve 130, the barrel body 160 and the tabs 150, and which performs a function of means of transmission, by being interposed longitudinally between the valve 130 and an element among the barrel body 160 and the tabs 150. Herein, the transmission ring 135 is interposed between the valve 130 and the tabs 150, and not between the valve 130 and the barrel body 160. In practice, the transmission ring 135 is mounted idly between the tabs 150 and the valve 130.

With the transmission ring 135 thereby interposed between the tabs 150 and the valve 130, the tabs 150 drive the valve 130 from the forward position to the rear position via the transmission ring 135, when the coupling element 101 changes from the uncoupled configuration to the coupled configuration.

For example, the transmission ring 135 comprises a ring body 140 which extends around the body 110, more particularly around the front part 112 and the intermediate part 113 and comprises pins 141 which are supported on the inside of the ring body 140 and protrude radially inwards, so as to cross through the ports 117. Each pin 141 thereby extends from the volume 171 to the conduit 111, whereas the ring body 140 extends only into the volume 171 without reaching the conduit 111. Thus, the means of transmission cross through the ports 117, in particular in the coupled configuration.

The elastic return member 161 is arranged radially on the outside with respect to the means of transmission, in particular with respect to the ring body 140.

The transmission ring 135 has a front surface 137, which comes into contact with the tabs 150. Herein, the front surface 137 is formed by the ring body 140. Herein, each tab 150 comprises a respective rear surface 142, by means of which the front surface 137 comes into contact with the tabs 150. The inner surface 142 is e.g. parallel to the heel 152. Such contact allows the tabs 150 to drive the transmission ring 135, and thereby the valve 130, along the rearward direction AR101.

The transmission ring 135 also has one or a plurality of rear surfaces 138, each rear surface 138 coming into contact with the valve 130. Herein, each rear surface 138 is formed by one of the pins 141. Herein, the valve 130 comprises a front surface 139, formed at the front of the skirt 134, by means of which the rear surfaces 138 come into contact with the valve 130.

To allow the transmission ring 135 to transmit the movement of the tabs 50 to the valve 130 via the pins 141 while the pins 141 are radially oriented, the longitudinal dimension of the ports 117 is greater than the displacement L130 of the valve 130 between the uncoupled configuration and the coupled configuration. The displacement L130 is measured parallel to the axis X110.

As shown in FIG. 8, when the coupling element 101 is in the uncoupled configuration, the means of transmission are disengaged longitudinally from the tabs 150 and/or the valve 130, leaving a longitudinal play J135 between the transmission ring 135 and the tabs 150 and/or the valve 130. In FIG. 8, the play J135 is shown between the transmission ring 135 and the tabs 150, in particular between the front surface 137 and the rear surface 142, while the rear surface or surfaces 138 of the transmission ring 135 are in contact with the valve 130.

During a coupling, the rear surface 142 of the tabs 150 comes into contact with the front surface 137 of the transmission ring 135, the transmission ring 135 coming into contact, via the rear surface or surfaces 138 thereof, with the front surface 139 of the valve 130, so as to allow the tabs 150 to drive the valve 130 from the forward position thereof to the rear position thereof, between the uncoupled configuration and the coupled configuration.

In FIGS. 8 to 10, the transmission ring 135 is drawn as a single integral part. However, in practice, for mounting the transmission ring 135 around the body 110, in particular when the body 110 as such consists of two assembled parts like herein, the transmission ring 135 could consist of a plurality of assembled parts.

In a variant, the rear surface or surfaces 138 of the transmission ring 135 are formed on pins and/or lugs which are longitudinal, rather than radial like the pins 141 shown, in order to reduce the longitudinal dimension of the corresponding ports 117.

Figure 11:
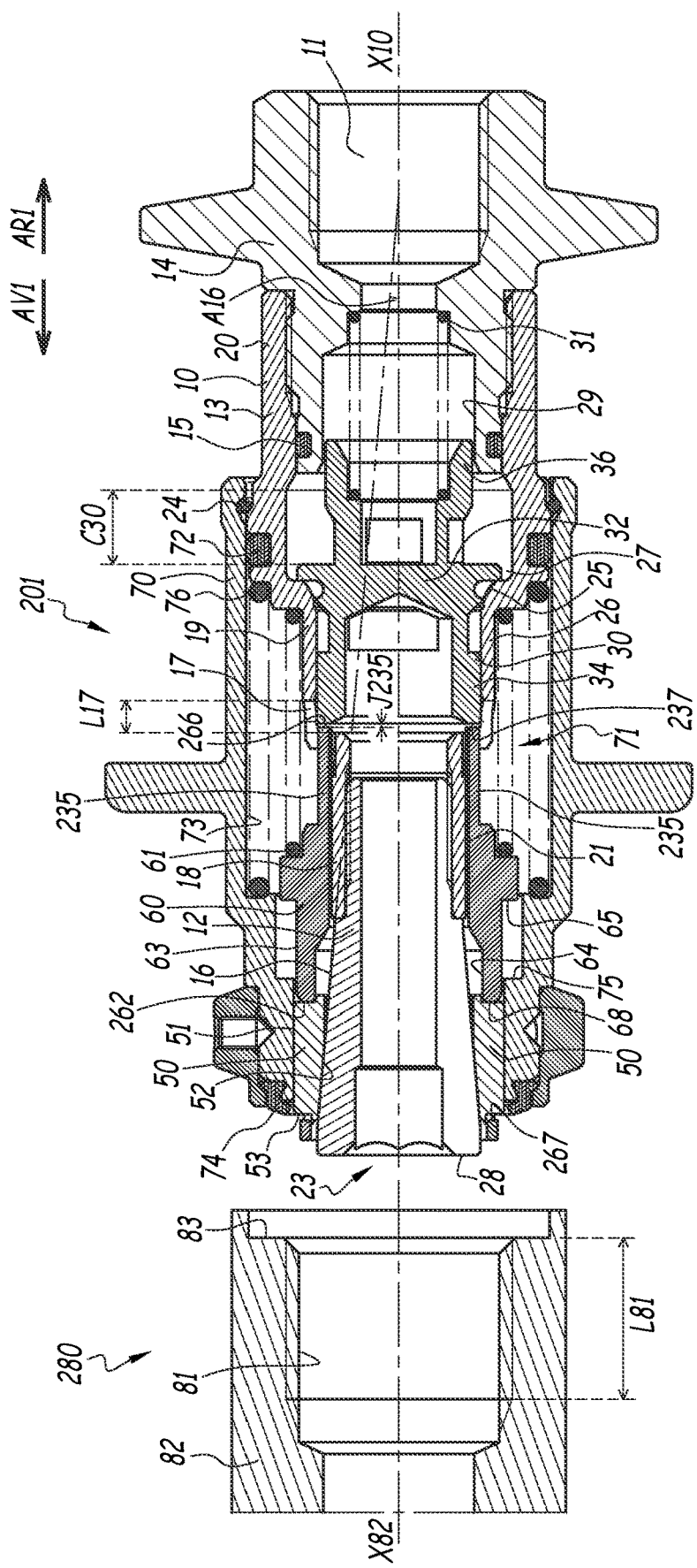
FIG. 11 is a longitudinal section of a coupling element according to a third embodiment of the invention, shown in an uncoupled configuration, where the coupling element is uncoupled from a terminal.
Figure 12:
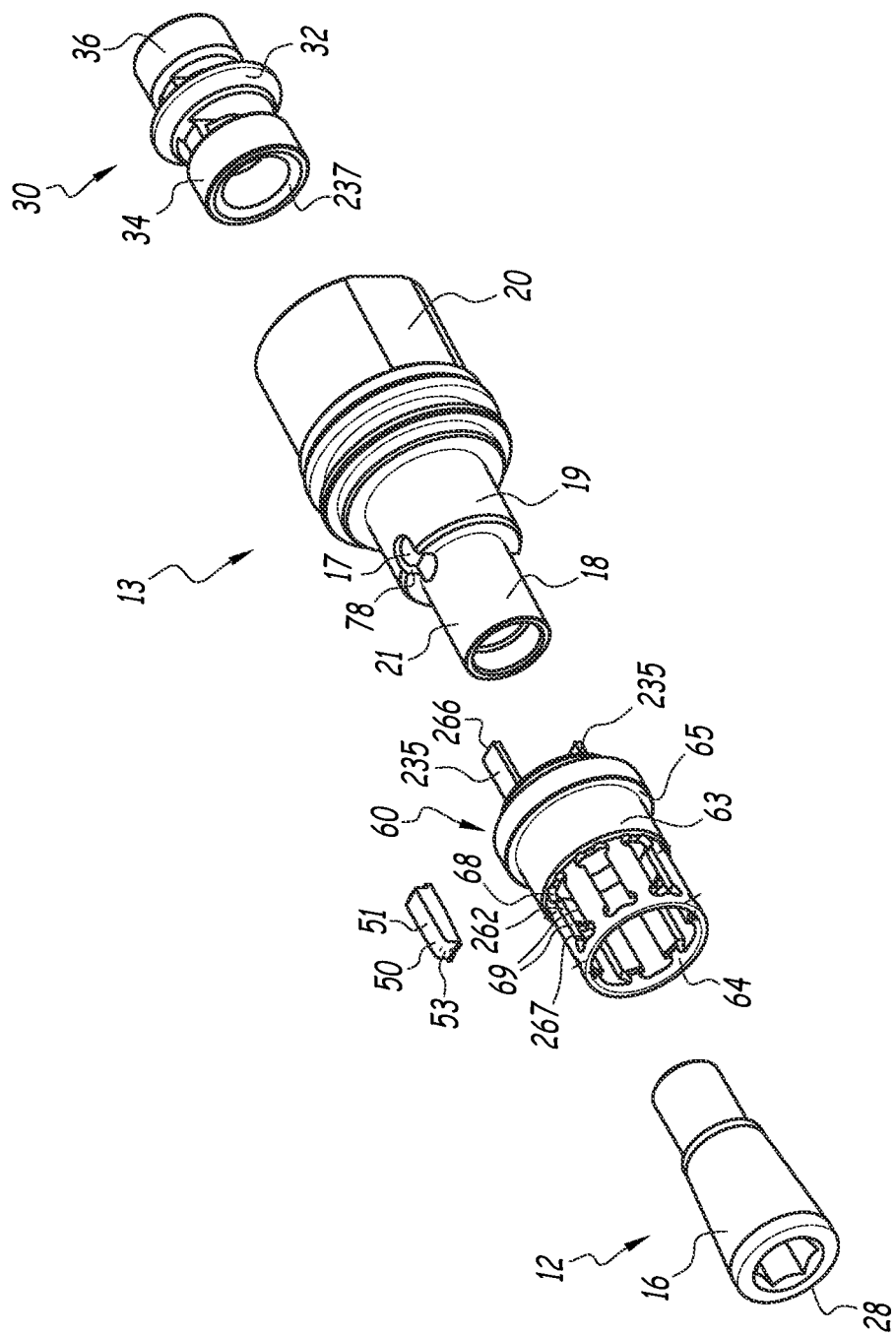
FIG. 12 is an exploded perspective view of the coupling element shown FIG. 11.
Figure 13:
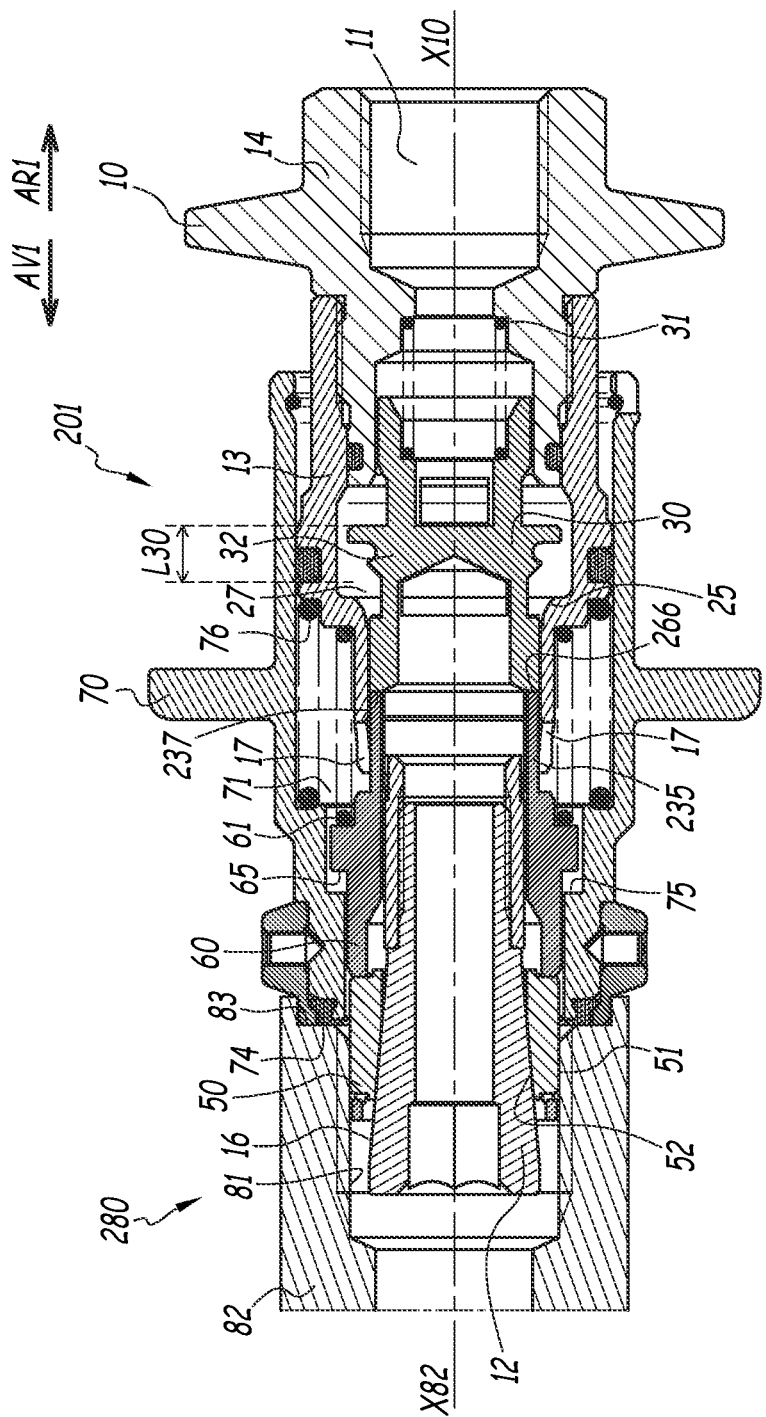
FIG. 13 is a section similar to the section shown in FIG. 11, wherein the coupling element is shown in a coupled configuration, where the coupling element is coupled to the terminal.

FIGS. 11 to 13 show a coupling element 201, to be coupled to a terminal 280, according to another embodiment. The terminal 280 is identical to the terminal 80. The coupling element 201 is identical to coupling element 1, except for the differences mentioned hereinafter. All the features already described hereinabove for the coupling element 1 and the terminal 80 apply to the element 201 and to the terminal 280, except for the differences mentioned hereinafter, and are identified by the same reference symbols in FIGS. 11 to 13 as in FIGS. 1 to 7. In FIG. 11, the coupling element 201 is in an uncoupled configuration. In FIG. 13, the coupling element 201 is in a coupled configuration.

Unlike the coupling element 1, the means of transmission of the coupling element 201 are formed by the barrel body 60 of the element 201. For this purpose, along the rearward direction AR1, the barrel body 60 continues e.g. as two longitudinal lugs 235, which extend rearwards and form a rear end of the barrel body 60. The valve 30 then advantageously has no lugs 35 which were provided for the coupling element 1. For the coupling element 201, the lugs 235 are engaged in the ports 17 and cross longitudinally through the ports 17 parallel to the axis X10, from the inner volume 71 to the inner conduit 11. The circumferential dimensions of the ports 17 of the coupling body 10 correspond to the circumferential dimensions of the longitudinal lugs 235. Thereby, the longitudinal movement of each lug 235 is guided by parallel orthoradial surfaces belonging to the coupling body 10 and delimiting the port 17 in which the lug 235 is engaged. When the coupling element 201 changes from the uncoupled configuration to the coupled configuration, the barrel body 60 drives the valve 30 by means of the lugs 235, from the forward position to the rear position, where the valve 30 opens the inner conduit 11. The lugs 235 are thus means of transmission by which the barrel body 60 is able to drive the valve 30 from the forward closed position to the rear open position.

The longitudinal lugs 235 each have a respective rear end surface 266. The rear end surfaces 266 are directed along the rearward direction AR1, opposite a front surface 237 belonging to the valve 30. The front surface 237 is herein formed at the front of the valve 30, more particularly of the skirt 34. In the uncoupled configuration, the valve 30 is in the forward closed position, in forward abutment against the body 10, and there is a longitudinal play J235 between the end surfaces 237 and 266. In other words, the lugs 235 are disengaged longitudinally from the valve 30. Like for the coupling element 1, there is a dead stroke at the beginning of coupling, when the barrel body 60 moves along the rearward direction AR1, corresponding to the play J235.

Unlike the coupling element 1, the coupling element 201 does not include the seal 33, the valve 30 of the coupling element 201 having no seal for closing off the passage 27. Instead, the passage 27 is reduced without being closed off in a sealed way when the valve 30 of the coupling element 201 is in the forward closed position and is increased when the valve 30 is in the rear open position. Preferably, when the valve 30 is in the forward closed position, the solid central portion 32 of the valve 30 of the element 201 is directly in forward abutment against the body 10 under the effect of the spring 31.

For the coupling element 201, the closing of the inner conduit 11 by the valve 30 is thus not sealed in the uncoupled configuration, but the valve 30 in the forward closed position nevertheless limits the passage of fluid out of the coupling element 201. In this way, it is possible to limit fluid leakage in the uncoupled configuration.

The coupling element 201 comprises openings 262, for performing the same function as the openings 62 provided for the coupling element 1. The openings 262 comprise an axial surface 267 which delimits the opening 262 forwards.

In a variant, the valve 30 comes into forward abutment against the barrel body 60, rather than against the coupling body 10, when the valve 30 is in the forward closed position. In such case, there is no longitudinal play J35 and hence no dead stroke.

Figure 14:
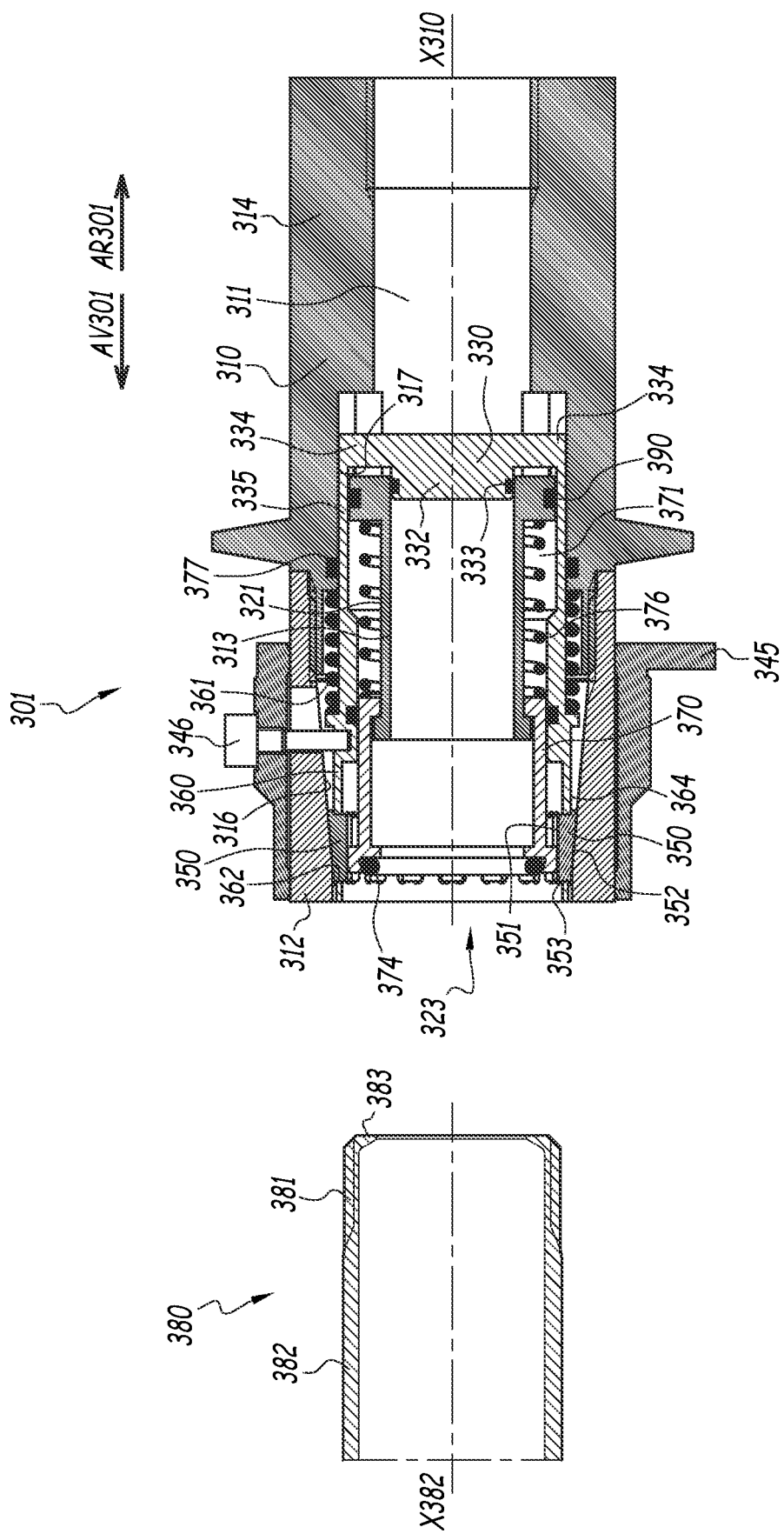
FIG. 14 is a longitudinal section of a coupling element according to a fourth embodiment of the invention, shown in an uncoupled configuration, where the coupling element is uncoupled from a terminal.
Figure 15:
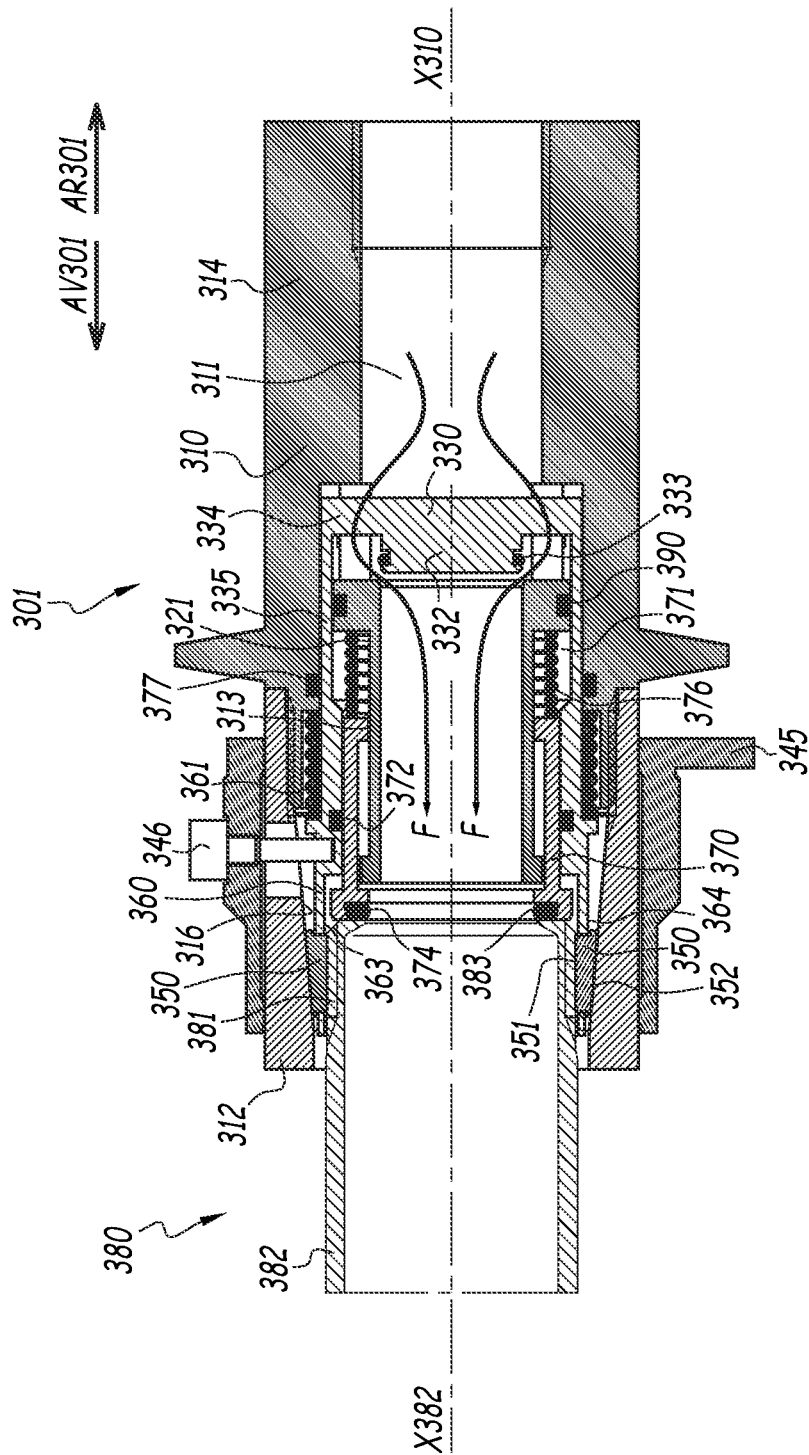
FIG. 15 is a section similar to the section shown in FIG. 14, wherein the coupling element is shown in a coupled configuration, where the coupling element is coupled to the terminal.

FIGS. 14 and 15 show a coupling element 301 to be coupled to a terminal 380, according to another embodiment. Except for the main differences mentioned hereinbelow, the coupling element 301 and the terminal 380 have a similar structure and functioning to the coupling element 1 and to the terminal 80 and are intended for a similar use.

The coupling element 301 comprises a coupling body 310, a valve 330, clamping tabs 350, a barrel body 360, a support ring 370 and a maneuvering ring 345.

A fitting axis X310 is defined which is fixed with respect to the coupling body 310 and on which the coupling body 310 is centered. A forward direction AV301, parallel to the axis X310, is defined and is directed from the coupling element 301 towards the terminal 380 to be coupled. A rearward direction AR301 is defined, in the opposite direction.

The terminal 380 comprises a terminal body 382, which is tubular, for conducting the flow of fluid F. A central axis X382 is defined, with which the body 382 is coaxial and which is fixed with respect to the body 382. The body 382 forms an interface 381. In the present example, the interface surface 381 is outer, unlike the interface 81 described hereinabove. The interface 381 has a cylindrical shell centered on the axis X382. The interface 381 ends on a front face 383 of the terminal 380. For example, the interface 381 is an outer thread centered on axis X382. When the terminal 380 and the coupling element 301 are coupled, the interface 381 is advantageously coaxial with the axis X310.

The coupling body 310 herein formed by only two assembled parts, namely a part forming both an intermediate part 313 and a rear part 314, and another part forming a front part 312. The body 310 delimits an inner conduit 311 for the circulation of the fluid F, the inner conduit 311 crossing through the parts 312, 313 and 314 along the axis X310.

The rear part 314 is intended for being connected to a fluid duct similar to the aforementioned duct 99 and is fixed by screwing to the part forming the front part 312.

The front part 312 forms a tapered portion 316 which is centered on the axis X310, convergent along the direction AV301 and oriented inwards and along the rearward direction AR301.

The intermediate part 313 is herein arranged inside the front part 312 and the rear part 314. The intermediate part 313 forms an outer radial surface 321 of the coupling body 310. The outer radial surface 321 thus radially faces the front part 312 and rear part 314 of the coupling body 310. An inner volume 371 is delimited, radially inside, by the outer radial surface 321 and radially outside by the front part 312 and rear part 314.

The coupling element 301 comprises a port 317 provided through the coupling body 310. A blind recess formed recessed in an inner radial surface of the rear part 314 delimiting the conduit 311, at a junction between the rear part 314 and the intermediate part 313, houses the valve 330. From such blind recess, the port 317 crosses through the body 310 along the forward direction AV301, beyond a rear end of the intermediate part 313, so as to come out into the inner volume 371. The port 317 links the blind recess of the conduit 311 to the inner volume 371. The port 317 delimits the interior volume V371 at the rear.

The valve 330 comprises a solid portion 332 which, in the uncoupled configuration, is arranged at least partially inside the intermediate part 313. The valve 330 further comprises radial bridges 334 which extend radially outwards from the solid portion 332 to the blind recess of the body 310.

The barrel body 360 is arranged around the outer radial surface 321 of the coupling body 310, inside the inner volume 371. More particularly, the barrel body 360 is mounted around the support ring 370 which is as such arranged around the outer radial surface 321 of the coupling body 310.

Unlike the valve 30 and the barrel body 60 of the coupling element 1, the valve 330 and the barrel body 360 are rigidly attached to each other parallel to the axis X310 in any configuration of the coupling element 301.

For this purpose, the coupling element 301 comprises a transmission ring 335 which axially links the barrel body 360, more particularly a rear end of the barrel body 360, to the valve 330, more particularly an outer radial end of the radial bridges 334. The transmission ring 335 crosses through the port 317 when the coupling element 301 is in the coupled configuration, as shown in FIG. 15.

The transmission ring 335 thereby forms means of transmission which are interposed between the valve 330 and the barrel body 360, being rigidly attached both to the valve 330 and to the barrel body 360. Thereby, the barrel body 360 and the valve 330 are driven mutually along the axis X310, being rigidly attached by means of the transmission ring 335. In other words, the barrel body 360 and the slide valve 330 are rigidly attached and movable in translation with respect to the opening 310 along the axis X310. Unlike the coupling element 1, the coupling element 301 does not provide any longitudinal play such as the play J35 in the uncoupled configuration. The valve 330, the transmission ring 335 and the barrel body 360 can be formed by a same integral piece, as shown in FIGS. 14 and 15, or, in a variant, by a plurality of pieces assembled together and rigidly attached to one another.

The coupling element 301 comprises an elastic return member 361. The member 361 is preferably a compression spring interposed between the barrel body 360 and the coupling body 310. The member 361 rigidly and jointly pushes the barrel body 360, the transmission ring 335 and the valve 330 along the forward direction AV301, with respect to the body 310. Thereby, only return member 361 pushes back both the barrel body 360 and the valve 330, unlike the valve 30 described hereinabove, which is pushed back by a spring 31 independent of the elastic return member 61 returning the barrel body 60.

The clamping tabs 350 are each received in a respective opening 362, belonging to the barrel body 360, so as to guide the displacement thereof along a radial translation. The clamping tabs 350 are displaced in translation, radially with respect to the barrel body 360 and with respect to the coupling body 310, between an outer radial withdrawal position (not shown), when the coupling element 301 is in the withdrawal configuration, an intermediate radial clamping position, shown in FIG. 15, when the coupling element 301 is in the coupled configuration, and an inner radial abutment position, shown in FIG. 14, when the coupling element 301 is in the uncoupled configuration. Like the openings 62, the openings 362 comprise two opposite parallel axial walls and two opposite parallel orthoradial walls, which guide the radial displacement of the clamping tabs 350.

The displacement in radial translation of the tabs 350 depends on the axial position of the tabs 350, the tabs 350 being displaced in radial translation by mechanical cooperation of the clamping tabs 350 with the front tapered portion 316. Unlike the tabs 50 described hereinabove, the tabs 350 are arranged on the inside of the tapered portion 316, said tapered portion 316 being internal and not external. To cooperate with the front tapered portion 316, each tab 350 comprises a heel 352 which, unlike the heel 52, is formed on the outside of the tab 350, the heel 352 being in contact with the tapered portion 316. Each tab 350 further comprises an inner surface 351 with a cylindrical shell. The inner surface 351 is oriented radially opposite from the heel 352, and hence from the tapered portion 316. By means of the surface 351, the clamping tab 350 is designed for cooperating mechanically with the outer interface 381, which has a cylindrical shell matching the surface 351. The inner surface 351 advantageously has an inner thread matching the thread of the interface 381.

By cooperation with the tapered portion 316, the inner radial abutment position of the tabs 350 corresponds to a forward axial position of the tabs 350, of the barrel body 360, of the transmission ring 335 and of the valve 330. The forward axial position is taken in the uncoupled configuration, as shown in FIG. 14. In the inner radial abutment position, the tabs 350 are in radial abutment via the heel 352 against an outer abutment surface 364 of the barrel body 360 radially facing the tapered portion 316.

As shown in FIG. 14, in the uncoupled configuration, the tabs 350 emerge from the barrel body 360 radially inwards. In particular, each tab 350 has a front face 353 facing a mouth 323 of the coupling element 301. A part of the front face 353 emerges radially inwards from an inner surface 363 of the barrel body 360 in front of the tabs 350, in the uncoupled configuration, and against which the front face 383 of the terminal 380 is intended for coming into axial contact at the beginning of the coupling, in order to push back along the direction AR301 an assembly comprising the tabs 350, the barrel body 360 and the valve 330.

In the forward axial position, the valve 330 closes the conduit 311. To this end, the solid portion 332 is preferably received at least partially inside the intermediate part 313. The solid portion 332 advantageously supports a seal 333 so as to provide radial sealing between the valve 330 and the intermediate part 313, thereby closing the conduit 311 in a sealed way. In the forward axial position, the valve 330 as such, in particular the solid portion 332, preferably does axially abut against the body 310.

Since the elastic return member 361 returns the valve 330 and the barrel body 360 along the direction AV301, same returns the valve 330 to the forward closed position.

Unlike the support ring 70, the support ring 370 is mounted inside the barrel body 360 and the tabs 350. A rear end of the support ring 370 is preferably mounted around the intermediate part 313, i.e. around the outer radial surface 321. The support ring 370 is movable in translation along the axis X310 with respect to the body 310 and is not rigidly attached to the assembly comprising the barrel body 360 and the valve 330.

A seal 372 is interposed between an inner surface of the barrel body 360, at the rear of the tabs 350, and an outer radial face of the support ring 370. A seal 377 is interposed between the barrel body 360 or the transmission ring 335 and the front part 312 or the rear part 314 of the coupling body 310. At the rear end thereof, the intermediate part 313 advantageously supports a seal 390 in sliding contact with the inner radial surface of the transmission ring 335. The seals 377 and 390 provide a seal at the port 317, between the inner conduit 311 and the inner volume 371.

At a front end of the support ring 370 is housed a front seal 374 intended for axially abutting against the front face 383 of the terminal 380 during the coupling and in the coupled configuration.

The coupling element comprises a spring 376 which applies an elastic return force on the support ring 370 along the forward direction AV301, so as to return the ring 370 along the forward direction AV301. For example, the spring 376 is a compression spring which is interposed longitudinally between the intermediate part 313 of the coupling body 10 and the support ring 370. Preferably, the spring 376 is arranged radially between the intermediate part 313 and the barrel body 360 and/or the transmission ring 335.

As shown in FIG. 15, by cooperation with the tapered portion 316, the intermediate radial position of clamping of the tabs 350 corresponds to an intermediate axial position of the tabs 350, of the barrel body 360 and of the valve 330. With respect to the position thereof taken with respect to the body 310 when the tab 350 is in the initial radial position, the cooperating surface 351 of each tab 350 in the radial clamping position is in a position offset radially outwards and offset longitudinally along the rearward direction AR301.

When the coupling element 301 is in the coupled configuration and is coupled with the terminal 380, the tabs 350 are in the intermediate radial clamping position, so as to cooperate mechanically with the interface 381 of the terminal 380, so as to prevent a withdrawal of the terminal 380 with respect to the coupling body 310. The barrel body 360 is then in the axial clamping position, where the barrel body 360 is in abutment along the forward direction AV301 against the tabs 350, under the action of the elastic return member 361. Ahead the tabs 350, the barrel body 360 has an inside diameter greater than the diameter of the interface 381. Thereby, the interface 381 is received at least partially within the barrel body 360, in the coupled configuration.

In the intermediate axial clamping position, the barrel body 360 opens the conduit 311 via the port 317. In other words, the barrel body 360 has opened the inner conduit 311 when the coupling element 301 changes from the uncoupled configuration to the coupled configuration. More particularly, in the rear open position, the solid portion 332 is retracted along the direction AR301 with respect to the intermediate part 313. The flow F can flow in the conduit 311 in particular between the rear part 314 and the intermediate part 313, crossing through the valve 330, between the radial bridges 334 in the blind recess.

When the coupling element 301 is set in the withdrawal configuration, while the coupling element 301 was in the coupled configuration and was coupled with the terminal 380, the tabs 350 are moved away from the interface 381, radially outwards. The inner surfaces 351 with a cylindrical shell of the tabs 150 then together delimit a virtual cylinder the diameter of which is less than the minimum diameter of the outer interface 381. The tabs 350 then allow the terminal to be withdrawn along the forward direction AV301 with respect to the coupling body 310.

By cooperation of the tabs 350 with the tapered portion 316, the outer radial withdrawal position of the tabs 350 corresponds to a rear axial position of the tabs 350 of the barrel body 360 and of the valve 330.

Unlike the coupling element 1, the maneuvering ring 345 is formed by a ring distinct from the ring forming the support ring 370. The maneuvering ring 345 is external to the coupling body 310, herein surrounding the front part 312. The maneuvering ring 345 is herein rigidly attached to the barrel body 360, e.g. by means of a screw 346 crossing radially through the body 310 for linking the maneuvering ring 345 to the barrel body 360. At the very least, the maneuvering ring 345 is able to drive the barrel body 360 along the rearward direction AR301 whereas the element 301 is in the coupled configuration, and thereby to set the element 301 in the withdrawal configuration.

In a variant of the embodiment shown in FIGS. 14 and 15, it is possible to provide for the ring 335 to be longitudinally interposed between the valve 330 and the barrel body 360, while forming a part separated from the barrel body 360 and the valve 330, or both from the barrel body 360 and from the valve 330. Such separated transmission ring can alternatively be arranged between the valve 330 and the tabs 350.

A coupling element (1) for a terminal (80) with cylindrical shell, comprising: a coupling body (10); a valve (30); a barrel body (60) movable in translation; clamping tabs (50), moved by cooperation with a tapered portion (16) of the coupling body (10), between initial and clamping radial positions; means of transmission (35), the barrel body (60) or the clamping tabs (50) being apt to drive the valve (30) via the means of transmission (35), from a forward position of closing of the body (60) to a rear open position, when the clamping tabs (50) move from the initial radial position to the radial clamping position; and a port (17) in the coupling body (10) letting through the means of transmission (35) when the valve (30) is in the rear position.

Any feature described hereinabove for one of the embodiments or one of the variants apply to the other embodiments and variants described hereinabove, as far as is technically possible.

The invention claimed is:
1. A coupling element for a fluidic coupling to a terminal, the terminal having an interface with a cylindrical shell, the coupling element comprising:
   a coupling body delimiting an inner conduit for a flow of fluid, the inner conduit extending along a longitudinal axis,
   a valve movable in translation longitudinally with respect to the coupling body inside the inner conduit, the valve being elastically returned along a forward direction to a forward position, where the valve closes the inner conduit, in an uncoupled configuration of the coupling element,
   clamping tabs,
   a barrel body arranged around a first radial surface of the coupling body, the first radial surface being radially oriented along the direction opposite the longitudinal axis, the barrel body being longitudinally movable in translation with respect to the coupling body,
   each clamping tab being received in a respective opening belonging to the barrel body,
   each clamping tab being displaced radially in translation with respect to the barrel body, within the respective opening thereof, and with respect to the coupling body, by mechanical cooperation of the clamping tab with a tapered portion of the coupling body, centered on the longitudinal axis and oriented along a rearward direction, said radial translational movement taking place from an initial radial position of the clamping tab, in the uncoupled configuration of the coupling element, to a radial clamping position of the clamping tab, offset along the longitudinal axis along the rearward direction with respect to the initial radial position,
   each clamping tab comprising a cooperating surface formed radially opposite the tapered portion and configured for mechanically cooperating with the terminal interface and thereby preventing a withdrawal of the terminal; with respect to the coupling body when the clamping tab is in the radial clamping position,
   a first elastic return member, returning the barrel body along the forward direction, the barrel body abutting along the forward direction against the clamping tabs when the clamping tabs are in the radial clamping position, means of transmission interposed between the valve and a drive element, among the barrel body and at least one of the clamping tabs, the drive element being apt to drive the valve via the means of transmission, from the forward position to a rear position, where the valve opens the inner conduit, when the clamping tabs move from the initial radial position to the radial clamping position, and at least one port, provided through the coupling body, coupling the inner conduit to a volume surrounding the first radial surface of the coupling body, the means of transmission extending through the port or the ports when the valve is in the rear position.

2. The coupling element according to claim 1, wherein the means of transmission are apt to cross longitudinally through the port or the ports from the volume surrounding the first radial surface of the coupling body to the inner conduit.

3. The coupling element according to claim 2, wherein, along the longitudinal axis, the or each port has a length which is strictly less than a maximum travel traveled by the valve, when the barrel body is moved longitudinally from the position thereof in the uncoupled configuration of the coupling element to a rear abutment position against the coupling body.

4. The coupling element according to claim 1, wherein the means of transmission are formed by one among the valve or the drive element and form a first surface apt to abut along the longitudinal axis on a second surface belonging to the other among the drive element or the valve.

5. The coupling element according to claim 4, wherein the means of transmission comprise at least one longitudinal lug and wherein the port is delimited by opposite guide surfaces of the coupling body, along a direction circumferential to the longitudinal axis, the longitudinal lug being apt to come into contact with each of the guide surfaces.

6. The coupling element according to claim 5, wherein:
the or each longitudinal lug is formed by the valve;
the first surface is formed at a front end of the valve; and
the second surface is formed at a rear end of the barrel body.

7. The coupling element according to claim 1, wherein the means of transmission are formed by a transmission ring, distinct from the barrel body, the clamping tabs and the valve, the transmission ring having a front surface apt to come into contact with a rear surface of the barrel body or of the clamping tabs and having a rear surface apt to come into contact with a front surface of the valve.

8. The coupling element according to claim 1, wherein, when the coupling element is in the uncoupled configuration, the means of transmission being longitudinally disengaged from the drive element and/or from the valve.

9. The coupling element according to claim 1, wherein in any configuration of the coupling element:
the means of transmission are rigidly attached to the drive element and to the valve parallel to the longitudinal axis; and
in addition to the return of the barrel body along the forward direction, the first elastic return member returns the valve to the forward position.

10. The coupling element according to claim 1, wherein the coupling element is configured for the fluidic coupling to the terminal, the interface of which having an inner cylindrical shell and wherein the tapered portion is formed by the first radial surface of the coupling body.

11. The coupling element according to claim 10, wherein the coupling element comprises:
a support ring which, when the coupling element is in the uncoupled configuration, is mounted around the barrel body and the clamping tabs, and
a second elastic return member pushing the support ring back along the forward direction,
and wherein:
the volume surrounding the first radial surface of the coupling body is delimited radially on the outside by the support ring and communicates fluidically with the inner conduit through the port or the ports; and
a front end of the support ring has a front seal for a leak-tight contact with the terminal, while the support ring is radially sealed with the coupling body at the rear of the volume radially delimited by the support ring and the first radial surface of the coupling body.

12. The coupling element according to claim 1, wherein each clamping tab has a front face which defines the cooperating surface along the forward direction, and wherein, in the uncoupled configuration:
the clamping tabs abut radially against an abutment surface of the barrel body; and
a part of the front face of each clamping tab emerges from a surface of the barrel body opposite the abutment surface and arranged at the front of the clamping tabs, each front face axially facing a mouth of the coupling element.

13. The coupling element according to claim 1, wherein the first elastic return member is arranged radially on the outside with respect to the means of transmission.

14. The coupling element according to claim 1, wherein the valve includes:
a solid central portion defining, along with the coupling body, a passage for the fluid in the inner conduit, the passage being reduced when the valve is in the forward position, with respect to the rear position;
a rear skirt; and
a front skirt, the rear skirt and the front skirt being arranged on both sides of the solid central portion along the longitudinal axis and mechanically cooperating with reduced radial play with a second inner radial surface of the coupling body, for a radial guiding of the movement of the valve between the forward position and the rear position, the second inner radial surface delimiting the inner conduit.

15. The coupling element according to claim 14, wherein when the valve is in the forward position, the valve abuts against the coupling body via a seal for closing the inner conduit in a leak-tight way.

16. The coupling element according to claim 1, wherein each opening of the barrel body receiving one of the clamping tabs is delimited longitudinally by two opposite parallel axial walls and circumferentially by two opposite parallel orthoradial walls, the axial and orthoradial walls being apt to come into contact with the clamping tab; so as to guide the radial displacement of the clamping tab with respect to the barrel body.

* * * * *